United States Patent
Haraguchi et al.

(10) Patent No.: US 6,696,821 B2
(45) Date of Patent: Feb. 24, 2004

(54) DC-DC CONVERTER, DUTY-RATIO SETTING CIRCUIT AND ELECTRIC APPLIANCE USING THEM

(75) Inventors: Akira Haraguchi, Kasugai (JP); Takashi Matsumoto, Kasugai (JP); Kyuichi Takimoto, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/345,352

(22) Filed: Jan. 16, 2003

(65) Prior Publication Data

US 2003/0151933 A1 Aug. 14, 2003

(30) Foreign Application Priority Data

Feb. 14, 2002 (JP) ........................................ 2002-036639

(51) Int. Cl.[7] ................................................ G05F 1/40
(52) U.S. Cl. ........................................ 323/222; 323/284
(58) Field of Search .................................. 323/222, 284, 323/282, 234, 288, 351

(56) References Cited

U.S. PATENT DOCUMENTS

| | | | | |
|---|---|---|---|---|
| 6,198,258 B1 | * | 3/2001 | Ando et al. | 323/222 |
| 6,198,264 B1 | * | 3/2001 | Nagaya et al. | 323/284 |
| 6,469,917 B1 | * | 10/2002 | Ben-Yaakov | 363/44 |
| 6,476,588 B2 | * | 11/2002 | Fohler | 323/222 |
| 6,522,115 B1 | * | 2/2003 | Greitschus | 323/288 |
| 6,600,295 B2 | * | 7/2003 | Kanekawa et al. | 323/222 |

FOREIGN PATENT DOCUMENTS

| | | |
|---|---|---|
| JP | 11-341791 | 12/1999 |
| JP | 2000-217340 | 8/2000 |
| JP | 2001-95237 | 4/2001 |

* cited by examiner

*Primary Examiner*—Bao Q. Vu
(74) *Attorney, Agent, or Firm*—Arent Fox Kintner Plotkin & Kahn, PLLC

(57) ABSTRACT

A DC—DC converter in which no operational instability occurs and ranges of input and output voltages are wide, an electric appliance using such DC—DC converter, and a duty-ratio setting circuit in which no operational instability occurs and ranges of input and output voltages of a converter circuit can be widen in controlling the converter circuit are provided. A DC—DC converter 10 has a converter circuit 110, an output voltage detection circuit 120 and a duty-ratio setting circuit 20. An error amplifier circuit 21 compares Vref1 with Vd to output a control voltage Vfb. A pulse-width modulator circuit 25 compares a triangular-wave voltage Vct with the control voltage Vfb to output a first pulse signal PWO. A second-pulse generator circuit 26 outputs a second pulse signal PSO having a predetermined on-duty ratio. A selector circuit 27 selects the first pulse signal PWO or the second pulse signal PSO according to the control voltage Vfb to output the selected signal to a transistor M1 as a rectangular-wave signal PS.

18 Claims, 12 Drawing Sheets

CIRCUIT STRUCTURE OF DC-DC CONVERTER DIRECTED TO EMBODIMENT

CIRCUIT STRUCTURE OF DC-DC CONVERTER DIRECTED TO RELATED ART

OPERATIONAL WAVEFORMS OF RESPECTIVE SECTIONS IN DC-DC CONVERTER OF FIG.1
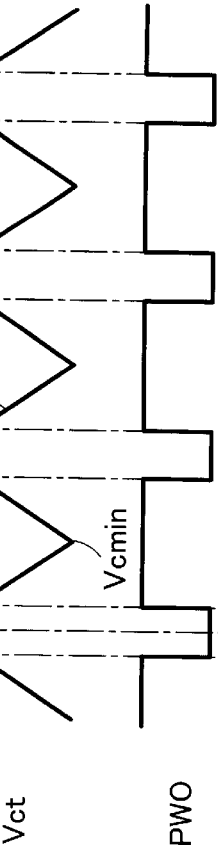
FIG.2(A) PRIOR ART — Vct
FIG.2(B) PRIOR ART — PWO
FIG.2(C) PRIOR ART — PSO
FIG.2(D) PRIOR ART — PSOx
FIG.2(E) PRIOR ART — PS
$$Vout = \frac{Ton + Toff}{Toff} \times Vin = Vin/(1-Don)$$

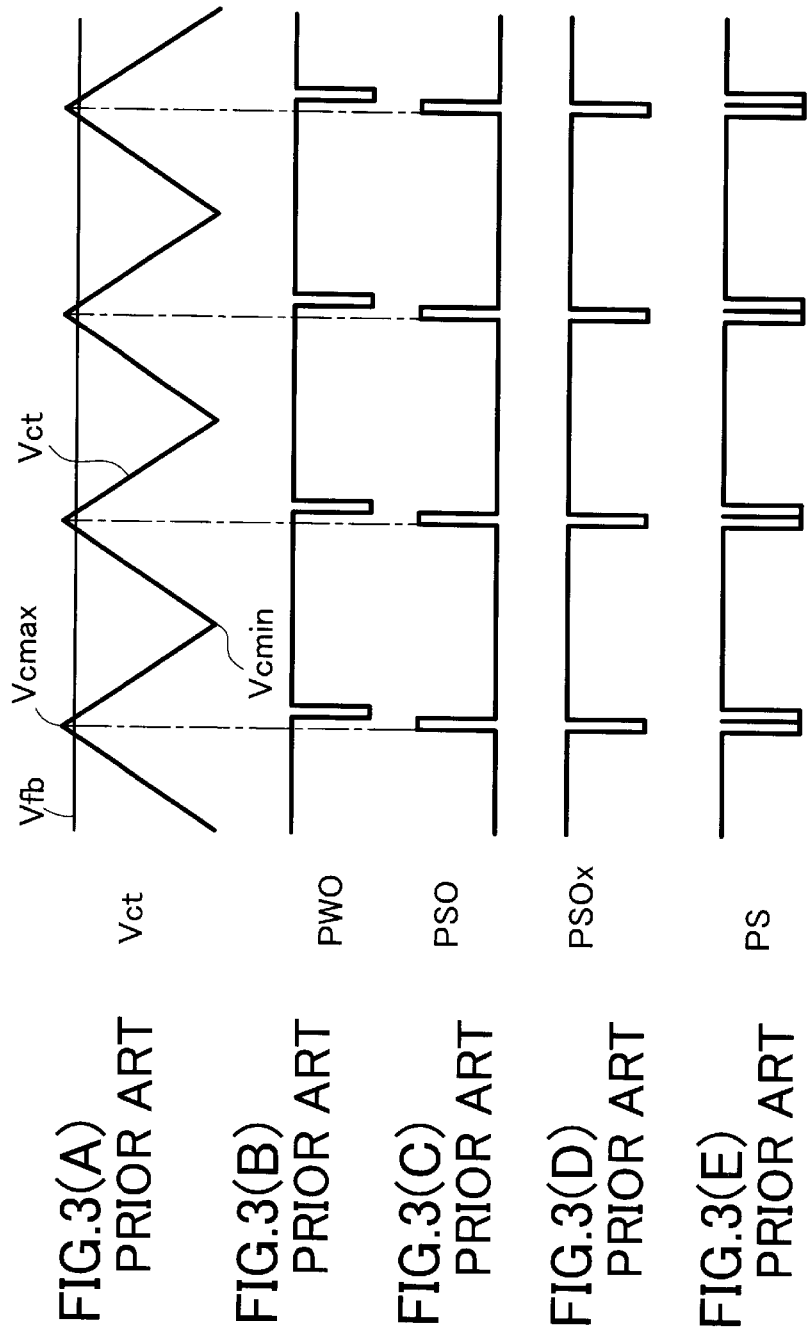

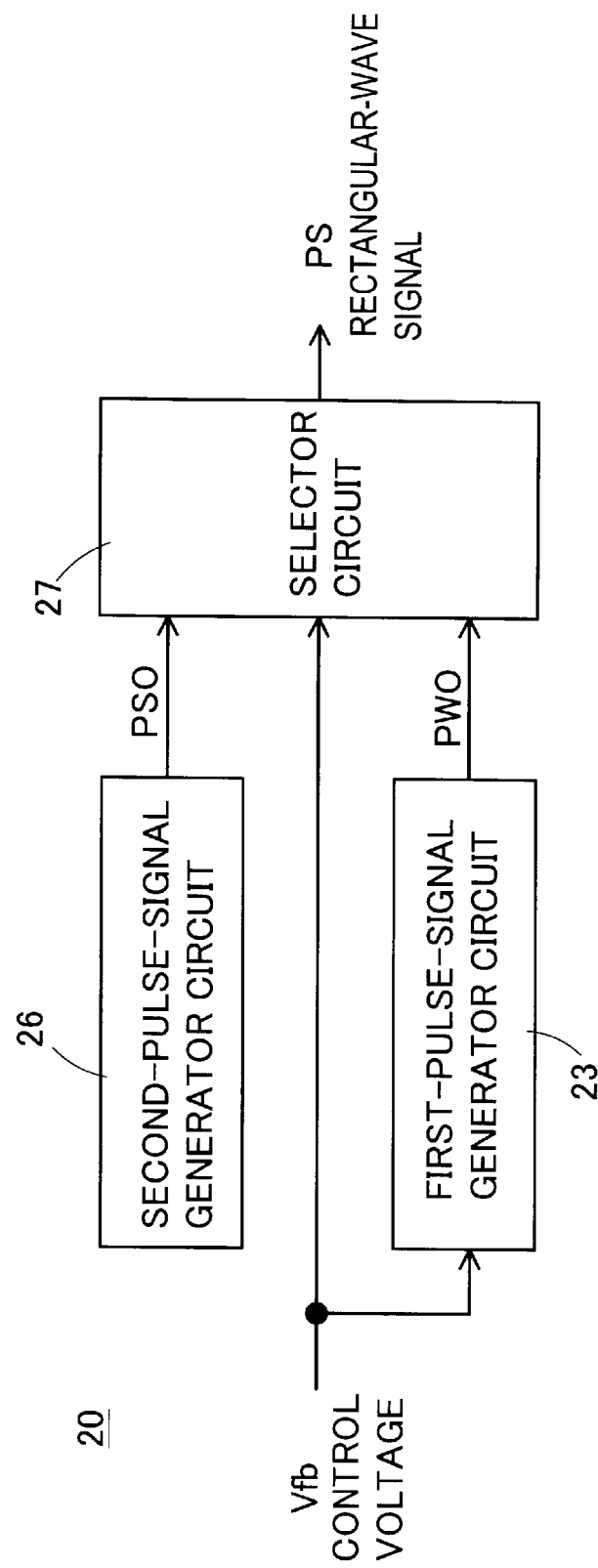
FIG.4 OPERATION PRINCIPLE OF DUTY-RATIO SETTING CIRCUIT DIRECTED TO PRESENT INVENTION

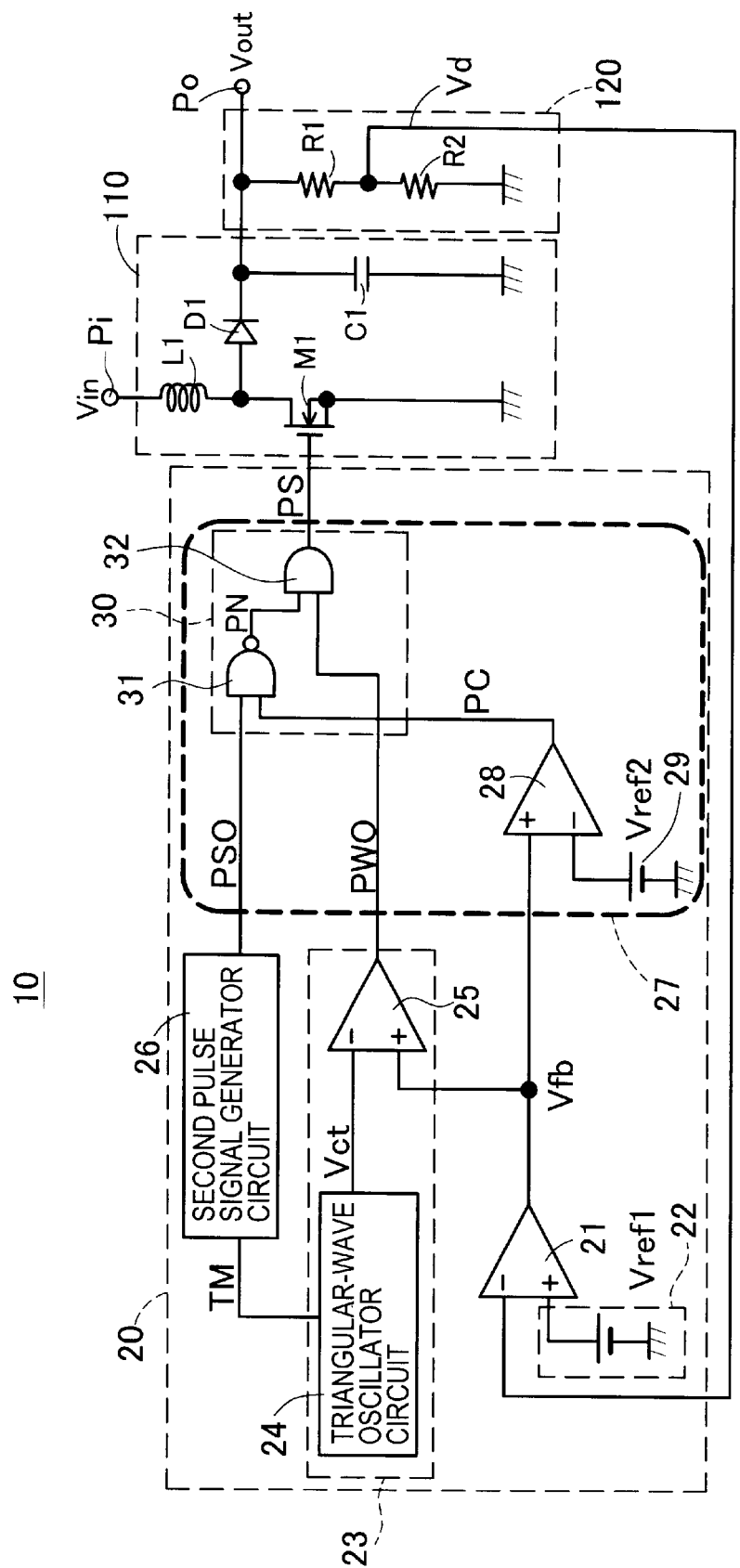
FIG.5 CIRCUIT STRUCTURE OF DC-DC CONVERTER DIRECTED TO EMBODIMENT

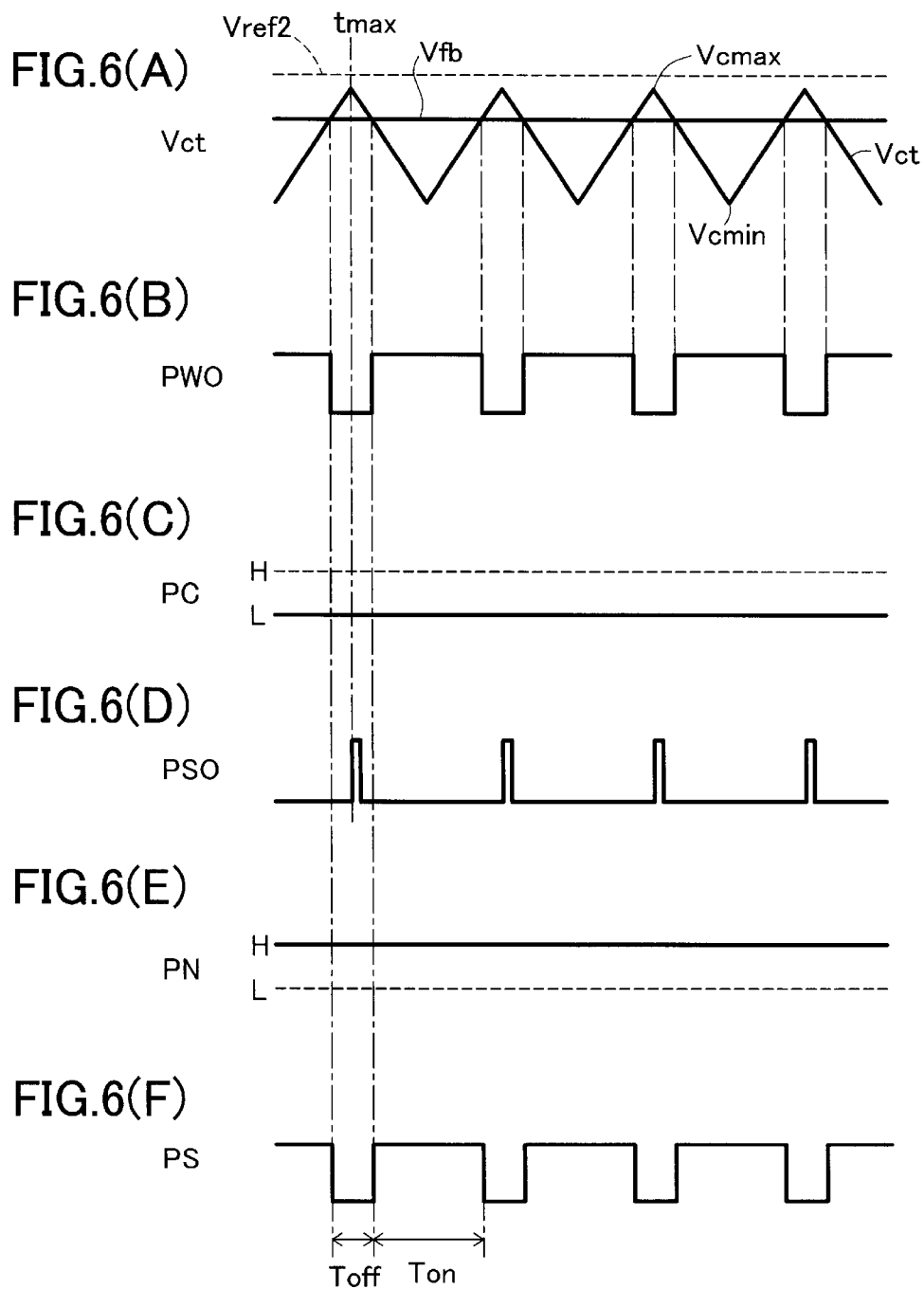
OPERATIONAL WAVEFORMS OF RESPECTIVE SECTIONS IN DC-DC CONVERTER DIRECTED TO EMBODIMENT OPERATIONAL WAVEFORMS OF RESPECTIVE SECTIONS IN DC-DC CONVERTER DIRECTED TO EMBODIMENT IN CASE CONTROL VOLTAGE Vfb BECOMES HIGH
FIG.7(A) Vct
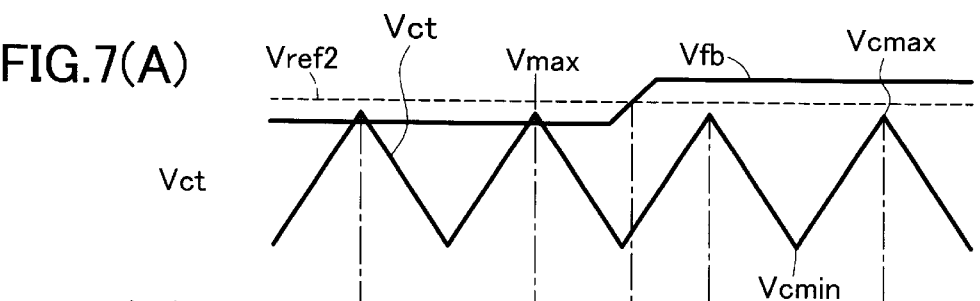
FIG.7(B) PWO
FIG.7(C) PC
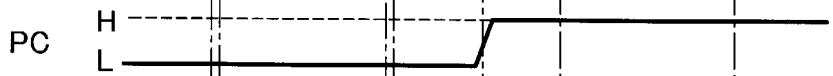
FIG.7(D) PSO
FIG.7(E) PN
FIG.7(F) PS
T1  T2

FIG.8    CIRCUIT DIAGRAM OF ELECTRIC APPLIANCE EMPLOYING DC-DC CONVERTER DIRECTED TO EMBODIMENT
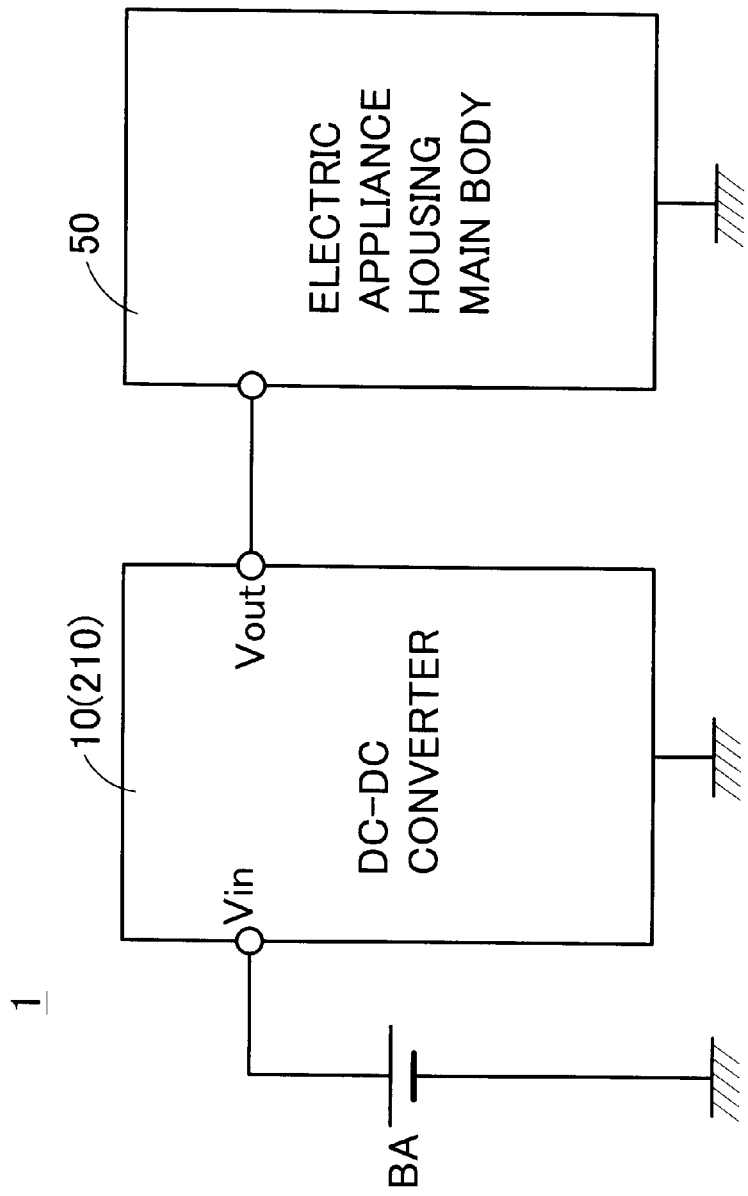

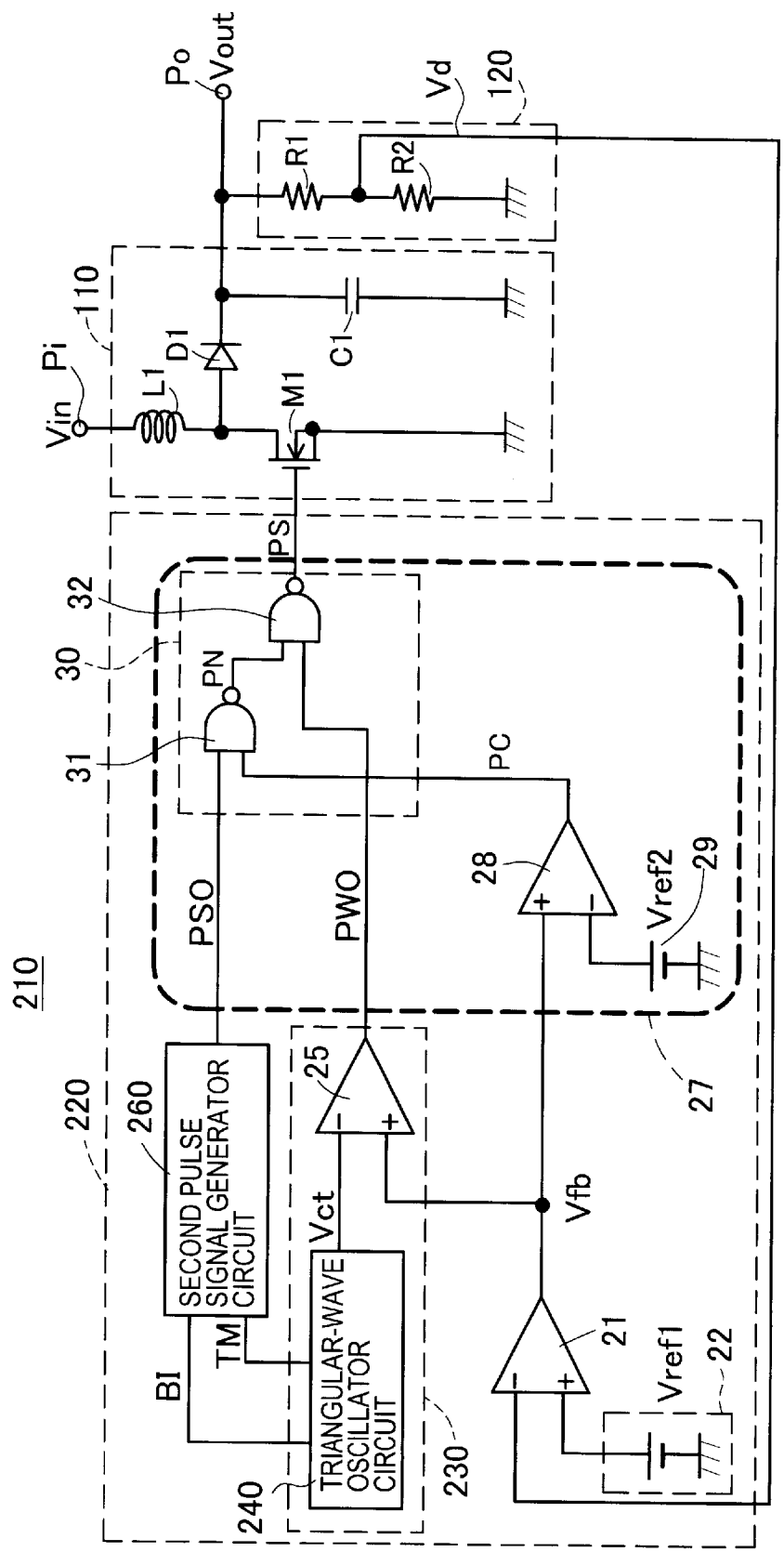
FIG.9 CIRCUIT STRUCTURE OF DC-DC CONVERTER DIRECTED TO MODIFIED EMBODIMENT

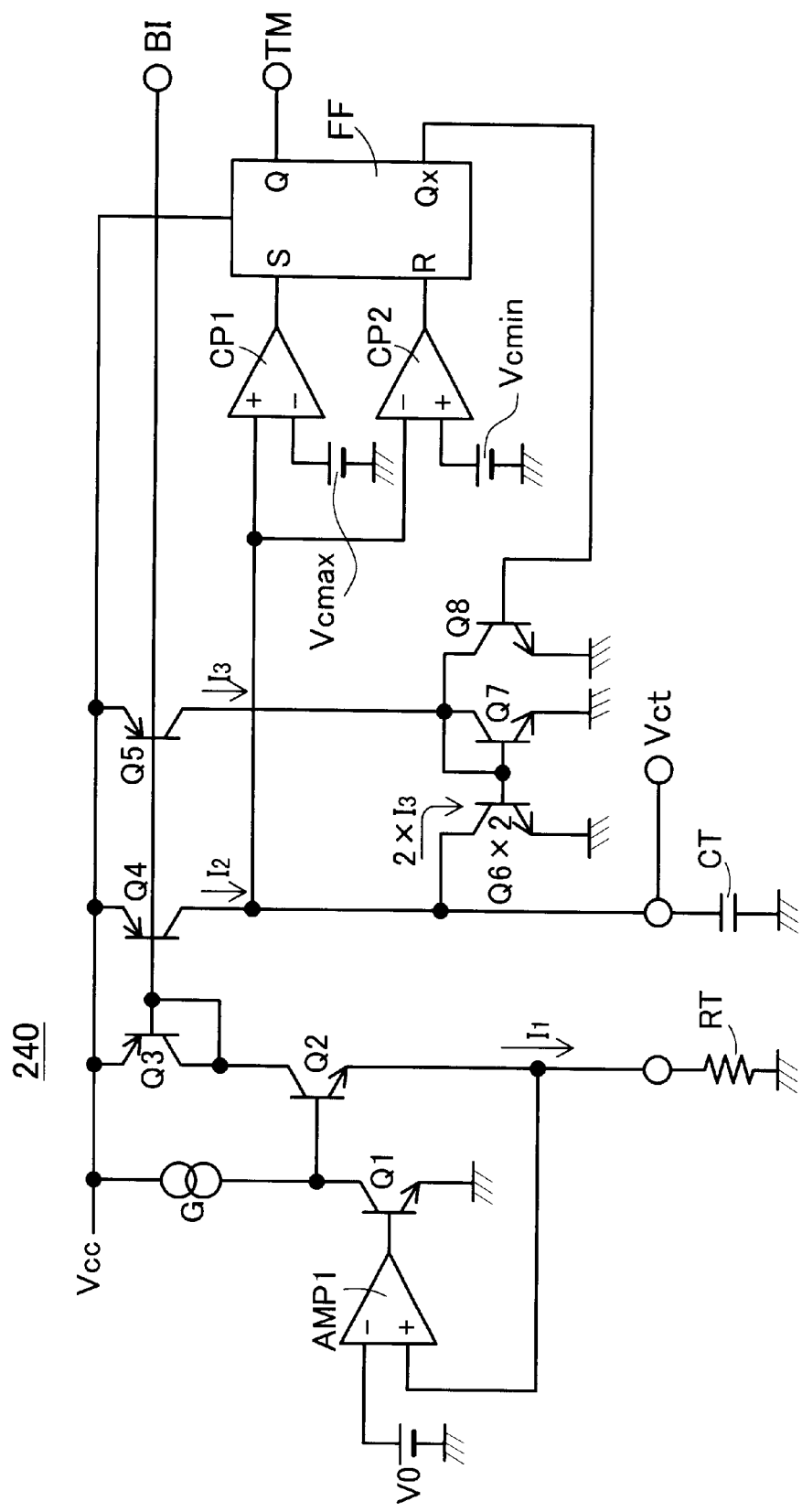
FIG.10 CIRCUIT STRUCTURE OF TRIANGULAR-WAVE GENERATOR CIRCUIT

FIG.11 CIRCUIT STRUCTURE OF SECOND-PULSE-SIGNAL GENERATOR CIRCUIT
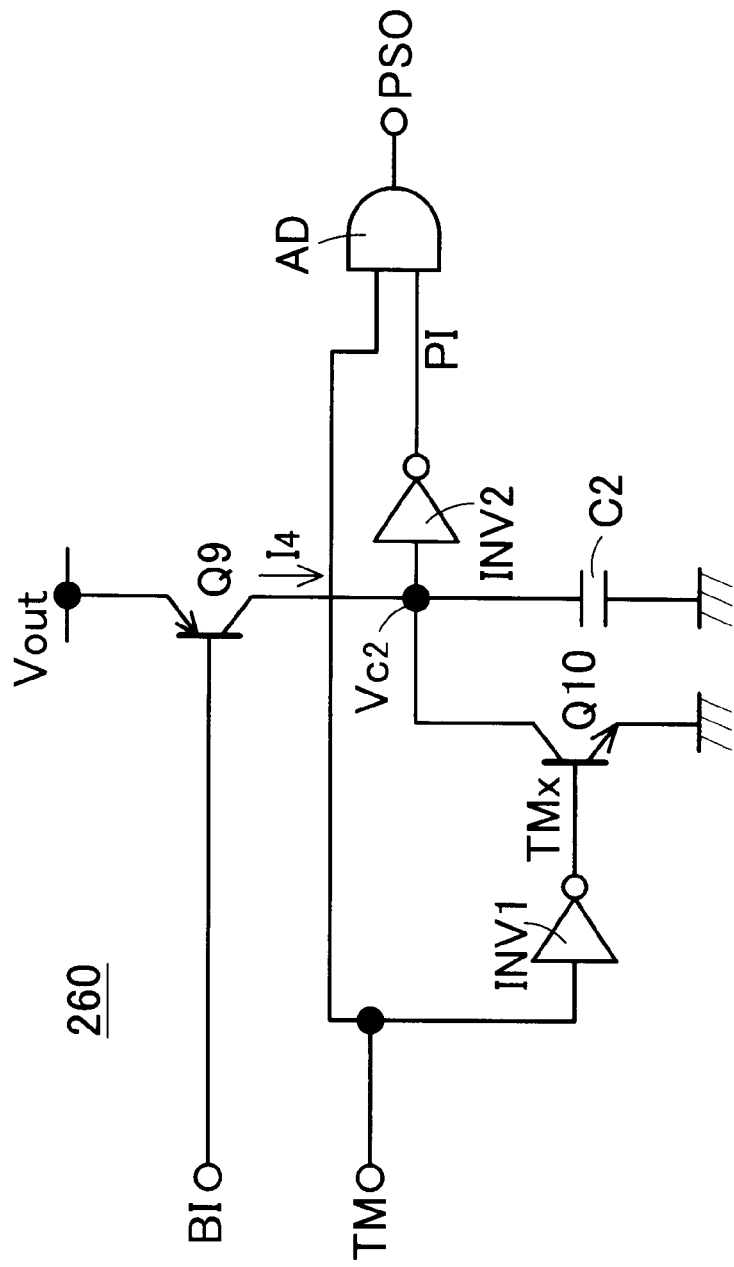

OPERATIONAL WAVEFORMS OF RESPECTIVE SECTIONS IN
SECOND-PULSE-SIGNAL GENERATOR CIRCUIT

TM

TMx

Vc2

PI

PSO

DC-DC CONVERTER, DUTY-RATIO SETTING CIRCUIT AND ELECTRIC APPLIANCE USING THEM

CROSS-REFERENCE TO RELATED APPLICATIONS

This application is based upon and claims the benefit of priority from each of the prior Japanese Patent Application No. 2002-36639 filed on Feb. 14, 2002, the entire contents of which are incorporated herein by reference.

BACKGROUND OF THE INVENTION

1. Field of the Invention

The present invention relates to a DC—DC converter, an electric appliance and a duty-ratio setting circuit.

2. Description of Related Art

A DC—DC converter capable of converting the direct current voltage into a predetermined level has been miniaturized and its efficiency has been highly increased, so that the DC—DC converter has been used for a power supply device of various kinds of electric appliances and its range of use has been increasingly enlarged. In such electric appliances, particularly such as a notebook type of personal computer and portable electric appliances such as a portable phone terminal, the DC—DC converter is an essential device since an IC, an electric circuit, motor and a liquid crystal display device in a main body of the above electric appliances are operated by means of a battery, for example, a primary battery such as an alkaline cell or a secondary battery such as a lithium-ionic cell and a nickel-hydrogen cell as a power supply.

The DC—DC converter, generally, comprises a converter circuit for converting an input voltage into an output voltage having a voltage value different from that of the input voltage in accordance with a switching element turned on and off by a rectangular-wave signal, as well as an output voltage detection circuit for detecting a value of the output voltage to output the detection voltage and a duty-ratio setting circuit for feedback-controlling a duty ratio of the rectangular-wave signal on the basis of the detection voltage so that the output voltage would be controlled at a predetermined value. This structure allows the output voltage of the DC—DC converter to be controlled at a constant value.

Recently, there is a need for the long use of electric appliances, particularly portable electric appliances. It means that there is a requirement of providing a DC—DC converter capable of operating and of supplying a main body of an electric appliance with a predetermined value of output voltage not only in the case that a between-terminal voltage, that is, an input voltage is high since a battery has enough energy, but also in the case that the between-terminal voltage (the input voltage) decreases since the energy is used to be discharged. In other words, a DC—DC converter having a wide operable range of the input voltage is required.

Furthermore, there is also a requirement of a DC—DC converter having a wider setting range of the output voltage so as to be applicable to devices having various specifications.

In a DC—DC converter, the voltage conversion is impossible when the on-duty ratio of the rectangular-wave signal is 100%. As a result, the output voltage in a step-up type of DC—DC converter would decrease to the earth potential, while that of a step-down type would rise up to the input voltage (the voltage of the battery). It is impossible, in practice, that the on-duty ratio exceeds 100%.

In the DC—DC converter, however, the on-duty ratio of the rectangular-wave signal is raised to maintain control in order to set the output voltage at a predetermined value, when the input voltage decreases due to consumption of a battery or the like. Therefore, the on-duty ratio of the rectangular-wave signal finally reaches nearly 100%.

In such case, slight fluctuation of the output voltage due to noise or fluctuation in voltage sometimes causes the on-duty ratio of the rectangular-wave signal, which is set in the duty-ratio setting circuit, to be 100% in calculation. Then, the DC—DC converter cannot output an appropriate voltage, so that the output voltage would decrease (in the case of the step-up type) or rise (in the case of the step-down type). This makes the difference larger between the actual value and the predetermined value of the output voltage and causes the on-duty ratio set in the duty-ratio setting circuit to be increased much more. In the above situation, feedback control is impossible for the DC—DC converter and the output voltage rapidly decreases to the earth voltage or rises to the input voltage. This sometimes makes it impossible to completely carry out a necessary sheltering operation by the time when the power supply of an electric appliance is cut.

In order to prevent the above problem, the following way is taken in some cases. That is, the maximum on-duty ratio possible to be set in the duty-ratio setting circuit is set at a value lower than 100% (80%, for example) in view of noise, fluctuation in voltage and the like. Then, after the duty ratio of the rectangular-wave signal reaches the maximum on-duty ratio to make the feedback control impossible, the output voltage to be generated is determined in accordance with the maximum duty ratio, so that a necessary sheltering operation can be carried out.

In such DC—DC converter, however, the on-duty ratio of the rectangular-wave signal cannot be set in more than the maximum on-duty ratio. Therefore, the operative range of the input voltage is made narrow or the range of the output voltage possible to be outputted is made narrow.

In view of the above, on the basis of the detection voltage of the output voltage detection circuit, a second pulse signal having a fixed on-duty ratio for determining the maximum on-duty ratio is generated separately from generation of a first pulse signal having an on-duty ratio appropriate for feedback control. A DC—DC converter is provided in which a signal having the smaller on-duty ratio is selected to be outputted by a logic process of the first and second pulse signals (see FIG. 1). The above DC—DC converter 100 is a DC—DC converter for raising an input voltage Vin such as a battery, which is inputted to an input terminal Pi, and for outputting an output voltage Vout from an output terminal Po. The DC—DC converter 100 has a converter circuit 110 for converting the input voltage Vin into the output voltage Vout, an output voltage detection circuit 120 for outputting a detection voltage Vd corresponding to the output voltage Vout and a duty-ratio setting circuit 130 for setting an on-duty ratio Don of a rectangular-wave signal PS applied to a switching element M1 on the basis of the detection voltage Vd.

The converter circuit 110 comprises an N-channel of MOS transistor M1, which is a switching element, a coil L1, a capacitor C1 and a diode D1 for preventing a reverse current. The DC input voltage Vin is applied through the coil L1 to a drain of the transistor M1. A source of the transistor M1 is connected to the ground. An anode of the diode D1 is connected to the drain of the transistor M1 while a cathode of the diode D1 is connected to the output terminal Po. The capacitor C1 is connected between the output terminal Po and the ground.

The output voltage Vout outputted from the output terminal Po is made higher than the input voltage Vin in accordance with ON/OFF control of the transistor M1, that is, raised to be outputted. Changing the ratio between ON time Ton and OFF time Toff of the transistor M1 can control the output voltage Vout at a predetermined value.

The output voltage Vout is, concretely, given by an equation of Vout={(Ton+Toff)/Toff} Vin=Vin/Doff. The off-duty ratio Doff is here expressed by an equation of Doff=Toff/(Ton+Toff), while the on-duty ratio Don is expressed by an equation of Don=Ton/(Ton+Toff)=1−Doff. Therefore, Doff+Don=1, and thereby, Vout=Vin/Doff=Vin/(1−Don).

In the output voltage detection circuit 120, the output voltage Vout at the output terminal Po is resistance-divided by resisters R1 and R2 to input the detection voltage Vd into the duty-ratio setting circuit 130.

The duty-ratio setting circuit 130 comprises an error amplifier 131, a triangular-wave oscillator circuit 133, a pulse-width modulator circuit 134, a pulse-signal generator circuit 135 and an AND circuit 137.

An operation of the duty-ratio setting circuit 130 will be described with reference to FIGS. 2 and 3. The error amplifier 131 compares the detection voltage Vd with a reference voltage Vref generated in a reference voltage generator circuit 132 and amplifies a difference voltage between the both voltages Vd and Vref to generate a control voltage Vfb. The triangular-wave oscillator circuit 133 outputs a triangular-wave voltage Vct in a shape of a triangular wave, which changes within a range from the maximum value Vcmax to the minimum value Vcmin (see FIG. 2(A)). When the triangular-wave voltage Vct generated in the triangular-wave oscillator circuit 133 is compared with the control voltage Vfb in the pulse-width modulator circuit 134, a first pulse signal PWO which is pulse-width modulated (PWM) with the control voltage Vfb is generated (see FIG. 2(B)). The triangular-wave oscillator circuit 133 outputs a timing signal TM other than the triangular-wave voltage Vct to the pulse-signal generator circuit 135, the timing signal TM switching a signal level at a timing tmax that the triangular-wave voltage Vct reaches the maximum value Vcmax.

The pulse signal generator circuit 135 generates by means of the timing signal TM a second pulse signal PSO having a comparatively short pulse width and rising at the timing tmax (see FIG. 2(C)). The first pulse signal PWO is inputted to an AND circuit 137 together with a inverted second pulse signal PSOx inverted by means of an inverter 136 from the second pulse signal PSO. Then, the first pulse signal PWO is selected to be outputted as the rectangular-wave signal PS when the control voltage Vfb is sufficiently lower than the maximum value Vcmax of the triangular-wave voltage Vct, as shown in FIG. 2(D) (see FIG. 2(E)). At the same time, the feedback control is carried out to control the output voltage Vfb of the error amplifier 131 so that both of Vout=(R1+R2) Vref/R2 and Vout=Vin/(1−Don) would be simultaneously satisfied, and then, the on-duty ratio Don of the first pulse signal PWO (the rectangular-wave signal PS) outputted from the pulse-width modulator circuit 134 is controlled.

On the other hand, the inverted second pulse signal PSOx is selected to be outputted as the rectangular-wave signal PS when the control voltage Vfb becomes close to the maximum value Vcmax of the triangular-wave voltage Vct and the width of the first pulse signal PWO at a low level is made narrower than that of the inverted second pulse signal PSOx at a low level.

Namely, the on-duty ratio Don having comparatively small value is enough when the input voltage Vin is high due to, for example, no consumption of a battery, and therefore, the first pulse signal PWO is selected in the AND circuit 137 so as to keep the output voltage Vout at a predetermined value. The value of the on-duty ratio Don becomes large, however, when the input voltage Vin decreases due to, for example, consumption of a battery. When the on-duty ratio Don of the inverted second pulse signal PSOx is the smaller value, the inverted second pulse signal PSOx is selected in the AND circuit 137 to output the output voltage Vout given by an equation of Vout=Vin/(1−Don). The maximum value of the on-duty ratio of the rectangular-wave signal PS set in the duty-ratio setting circuit 130 is thus determined, so that the DC—DC converter 100 can be driven up to the maximum on-duty ratio of the inverted second pulse signal PSOx, regardless of noise and voltage fluctuation. In addition, the on-duty ratio Don is prevented from reaching 100%, and therefore, it is also prevented from occurring that the output voltage Vout decreases to the earth voltage or rises to the input voltage Vin due to the on-duty ratio Don reaching 100%. Accordingly, the maximum on-duty ratio, which can be set in the duty-ratio setting circuit 130, can be closer to 100% (90%, for example), so that even lower input voltage Vin can obtain a constant output voltage Vout. Otherwise, a wider range of output voltage Vout can be outputted.

In such DC—DC converter 100, however, since the first pulse signal PWO and the inverted second pulse signal PSOx, which are inputted to the AND circuit 137, are separately generated in the pulse-width modulator circuit 134 and the pulse generator circuit 135, there would be somewhat a difference in respective timing for change due to circuit delay, so that it would be difficult to accord the both timing for change. When the value of the control voltage Vfb is close to the maximum value Vcmax of the triangular-wave voltage Vct, the rectangular-wave signal PS outputted from the AND circuit 137, in some cases, shows because of difference in timing for change between the first pulse signal PWO and the second pulse signal PSO an abnormal waveform in which the first pulse signal PWO overlaps the second pulse signal PSO, as shown in FIGS. 3(A) to 3(E). This may cause instability in operation of the DC—DC converter 100. This is a reason why it is impossible in view of circuit delay to extremely narrow the width of a pulse of the second pulse signal PSO, that is, to extremely increase the on-duty ratios of the inverted second pulse signal PSOx and the second pulse signal PSO. For this reason, it is also impossible in the above mode to completely widen a range of the input voltage and/or the output voltage.

SUMMARY OF THE INVENTION

The invention is made in view of the above problems. A purpose of the invention is to provide a DC—DC converter in which no operational instability occurs, a DC—DC converter in which a range of an operable input voltage is wide or a range of an output voltage possible to be outputted is wide, and an electric appliance using such a DC—DC converter. Another purpose of the invention is to provide a duty-ratio setting circuit in which no operational instability occurs in controlling a converter circuit, a duty-ratio setting circuit in which a range of an operable input voltage in a converter-circuit can be widen or a range of an output voltage possible to be outputted can be widen, and an electric appliance using such a duty-ratio setting circuit.

A first aspect of the invention is a DC—DC converter comprising: a converter circuit which includes a switching element and switches the switching element by means of a rectangular-wave signal to convert an input voltage into an output voltage having a value different from a value of the input voltage; an output voltage detection circuit for detecting the value of the output voltage to output a detection voltage; and a duty-ratio setting circuit for generating on the basis of the detection voltage the rectangular-wave signal in which the on-duty ratio is set so that the output voltage would be controlled at a predetermined value and for outputting the rectangular-wave signal to the switching element, wherein the duty-ratio setting circuit comprises: a control-voltage generator circuit for inputting a first reference voltage and the detection voltage to output the control voltage corresponding to a difference therebetween; a first-pulse generator circuit for inputting the control voltage to output a first rectangular pulse signal in which the on-duty ratio changes monotonously with relation to the change of the control voltage; a second-pulse generator circuit for generating a second rectangular pulse signal having a predetermined on-duty ratio; and a selector circuit for selecting one of the first pulse signal and the second pulse signal to output the one as the rectangular-wave signal, in which the first pulse signal is selected and outputted when the control voltage is biased to a first direction compared with the second reference voltage while the second pulse signal is selected and outputted when the control voltage is biased to a second direction compared with the second reference voltage, the first direction being a direction that the on-duty ratio of the first pulse signal becomes smaller as the control voltage is changed, and the second direction being a direction that the on-duty ratio becomes larger to the contrary.

In accordance with the above DC—DC converter, the control voltage and the second reference voltage are compared, and thereby, either the first pulse signal or the second pulse signal would be selected in the selector circuit. Therefore, unlike the related art described above, the rectangular-wave signal in any case shows no abnormal waveform in which the first pulse signal overlaps the second pulse signal when the on-duty ratio becomes large, so that there is no risk that operational instability of the DC—DC converter would occur. Furthermore, it is not necessary to set the on-duty ratio of the second pulse signal in view of difference in timing of change or circuit delay of the both signals.

The first pulse signal is selected when the value of the control voltage is biased to the first direction with reference to the second reference voltage. The first direction is a direction that the on-duty ratio of the first pulse signal becomes smaller upon changing the control voltage. Except for a transitional period such as a beginning time of starting and a switching time from the first pulse signal to the second pulse signal, the control voltage controls the on-duty ratio so that the output voltage would become a predetermined value when the first pulse signal is selected. That is, the feedback control is performed.

On the other hand, the second pulse signal is selected when the value of the control voltage is biased to the second direction with reference to the second reference voltage. The second pulse signal has a predetermined on-duty ratio, and therefore, an output voltage determined on the basis of the predetermined on-duty ratio can be generated in accordance with an equation of Vout=Vin/(1−Don) in a converter circuit. It goes without saying that the predetermined on-duty ratio of the second pulse signal is lower than 100%.

The on-duty ratio denotes in this specification a time rate in which a switching element turns on in a converter circuit. Thus, the on-duty ratio of a pulse signal in which the level is switched between high and low at a timing same as the rectangular-wave signal applied into a switching element is also indicated as the on-duty ratio in the duty-ratio setting circuit, wherein a period for continuing the level on a side corresponding to a time that the switching element turns on is considered to be an ON time. Accordingly, when the high level of a certain pulse signal corresponds to the ON of the switching element, the period for continuing the high level is considered to be the ON time to calculate the on-duty ratio. When the low level of a certain pulse signal corresponds to the ON of the switching element to the contrary, the period for continuing the low level is considered to be the ON time to calculate the on-duty ratio.

The selection in this specification means that a signal to be selected and a signal obtained by the selection are in a relation that they are level-inverted at the same timing. Thus, when the first pulse signal or the second pulse signal inputted to the selector circuit and a rectangular-wave signal outputted are in the relation that they are level-inverted at the same timing for the purpose of a logic process in the selector circuit, the rectangular-wave signal is considered to be the first pulse signal or the second pulse signal, which has been selected, even in a logically inversed relation each other.

Another aspect of the invention is a DC—DC converter comprising: a converter circuit which includes a switching element and switches the switching element by means of a rectangular-wave signal to convert an input voltage into an output voltage having a value different from a value of the input voltage; an output voltage detection circuit for detecting the value of the output voltage to output a detection voltage; and a duty-ratio setting circuit for outputting to the switching element the rectangular-wave signal in which the on-duty ratio is set on the basis of the detection voltage so that the output voltage would be a predetermined value and for carrying out feedback control, wherein the duty-ratio setting circuit generates the rectangular-wave signal having a predetermined on-duty ratio when the on-duty ratio of the rectangular-wave signal set on the basis of the detection voltage reaches substantially 100% and the feedback control becomes impossible.

In a conventional DC—DC converter, the converter circuit can no longer convert voltage when the on-duty ratio of the rectangular-wave signal, which is set on the basis of the detection voltage, reaches substantially 100%, so that the output voltage would start falling or rising, and thereby, the output voltage cannot be maintained at a predetermined value. Then, the feedback control is performed so as to increase the on-duty ratio more, which makes the feedback control impossible, and as a result, the output voltage decreases to the earth potential or rises to the input voltage.

In the DC—DC converter according to the invention, however, the rectangular-wave signal having a predetermined on-duty ratio is generated when the feedback control is impossible. Then, it is possible to generate the output voltage determined in accordance with a predetermined on-duty ratio although the feedback control cannot maintain the output voltage at a predetermined value.

Accordingly, it is possible to give a time for taking measures such as a predetermined sheltering operation against the decrease of the input voltage even when the input voltage decreases due to, for example, consumption of a battery in a notebook-type of personal computer, a portable phone terminal and motor control, which are driven by the DC—DC converter.

In the DC—DC converter according to the invention, the feedback control can maintain the output voltage at a constant value until the on-duty ratio reaches substantially 100%. Thus, it is possible in the DC—DC converter to make a range of the input voltage maximum as well as a range of the output voltage maximum.

The case that the on-duty ratio reaches substantially 100% includes the following case in this specification other than the case that the on-duty ratio reaches 100%. That is, it includes a case that the on-duty ratio of the rectangular-wave signal reaches a large value (99.5%, for example) and the output voltage decreases to the earth potential or increases to the input voltage, as well as the case that a signal having the duty-ratio being 100% is inputted, in accordance with characteristics of other circuit elements such as a switching element, a coil of the converter circuit even when the rectangular-wave signal is inputted into the switching element.

Further aspect of the invention is an electric appliance comprising: the DC—DC converter according to any one the above; a battery for supplying the DC—DC converter with the input voltage; and a main body of the electric appliance driven by using the output voltage of the DC—DC converter.

In such electric appliance, using a battery as a power supply to convert a voltage by means of the DC—DC converter drives a main body of the electric appliance. An operation of the DC—DC converter therefore cannot be unstable when the input voltage to the DC—DC converter decreases due to consumption of a battery to increase the on-duty ratio. Furthermore, it is possible to drive the main body of the electric appliance by obtaining a constant value of the output voltage until the on-duty ratio of a switching element increases too much to continue the feedback control, so that a time period during which the main body of the electric appliance can be used by means of a battery would be extended in some cases.

Moreover, the switching element can be turned on and off in accordance with the rectangular-wave signal having a predetermined on-duty ratio, which is the second pulse signal, even after the feedback control cannot be continued. Then, the output voltage determined in accordance with the predetermined on-duty ratio and the input voltage (the between-terminal voltage of a battery) can be obtained, which enables a necessary sheltering operation such as sheltering of data or system information under a memory to be carried out before the power supply is cut.

The invention is applicable to any electric appliance so long as a battery drives the DC—DC converter in the electric appliance and the output voltage therefrom is used for driving the main body of the electric appliance. Concretely, the applicable electric appliances are, for example, a mobile personal computer of a notebook type or the like, a portable phone terminal, and a mobile sound-recorder, image-recorder and playback equipment for recording and reading out an image, sound or other information in or from a recording medium such as a compact disc and a DVD.

Another aspect of the invention is a duty-ratio setting circuit, which is used for a DC—DC converter comprising a converter circuit which includes a switching element and switches the switching element by means of a rectangular-wave signal to convert an input voltage into an output voltage having a value different from a value of the input voltage and an output voltage detection circuit for detecting the value of the output voltage to output a detection voltage, for setting on the basis of the detection voltage an on-duty ratio of the rectangular-wave signal so that the output voltage would be controlled at a predetermined value, the duty-ratio setting circuit comprising: a control-voltage generator circuit for inputting a first reference voltage and the detection voltage to output the control voltage corresponding to a difference therebetween; a first-pulse generator circuit for inputting the control voltage to output a first rectangular pulse signal in which the on-duty ratio changes monotonously in accordance with the change of the control voltage; a second-pulse generator circuit for generating a second rectangular pulse signal having a predetermined on-duty ratio; and a selector circuit for selecting and outputting one of the first pulse signal and the second pulse signal, in which the first pulse signal is selected and outputted when the control voltage has a value biased to a first direction with reference to the second reference voltage while the second pulse signal is selected and outputted when the control voltage has a value biased to a second direction with reference to the second reference voltage, the first direction being a direction that the on-duty ratio of the first pulse signal becomes smaller as the control voltage is changed, and the second direction being a direction that the on-duty ratio becomes larger to the contrary.

The duty-ratio setting circuit according to the invention is used for a DC—DC converter comprising a converter circuit and an output voltage detection circuit and has a control-voltage generator circuit, a first-pulse generator circuit and a second-pulse generator circuit as well as a selector circuit to select in accordance with the result of comparison between the control voltage and the second reference voltage either the first pulse signal having an on-duty ratio changing in accordance with the control voltage or the second pulse signal having a predetermined on-duty ratio. Thus, the rectangular-wave signal in any case shows no abnormal waveform that the first pulse signal overlaps the second pulse signal, when the on-duty ratio becomes large, unlike the case of the duty-ratio setting circuit 130 in the DC—DC converter 100 according to the related art described above. There is therefore no risk that operational instability of the DC—DC converter 100 would occur, and further, it is not necessary to set the on-duty ratio of the second pulse signal in view of difference in timing of change or circuit delay of the both signals.

Moreover, in accordance with the duty-ratio setting circuit, the rectangular-wave signal (the first pulse signal) having an on-duty ratio corresponding to the control voltage can be outputted when the control voltage is biased to the first direction with reference to the second reference voltage. Thus, controlling ON and OFF of a switching element of the converter circuit can perform the feedback control so that the output voltage is maintained at a constant value. On the other hand, the rectangular-wave signal (the second pulse signal) having a predetermined on-duty ratio can be outputted when the control voltage is shifted to the second direction, that is, when the control voltage changes to a direction that the on-duty ratio increases, and thereby, exceeds the second reference voltage. Since the on-duty ratio of the rectangular-wave signal applied to a switching element never reaches 100%, the output voltage cannot decrease to the earth potential and cannot increase to the input voltage even in the case that the control voltage applied to the duty-ratio setting circuit greatly changes in the second direction because of decrease of the input voltage of the DC—DC converter, which is caused by consumption of a power supply battery, for example.

Yet another aspect of the invention is a duty-ratio setting circuit used for a DC—DC converter comprising a converter circuit which includes a switching element and switches the switching element by means of a rectangular-wave signal to convert an input voltage into an output voltage having a value different from a value of the input voltage and an output voltage detection circuit for detecting the value of the output voltage to output a detection voltage, the duty-ratio setting circuit outputting to the switching element the rectangular-wave signal in which the on-duty ratio is set on the basis of the detection voltage so that the output voltage would become a predetermined value and carrying out feedback control, and the duty-ratio setting circuit generating the rectangular-wave signal having a predetermined on-duty ratio, when the on-duty ratio of the rectangular-wave signal set on the basis of the detection voltage reaches substantially 100% and the feedback control becomes impossible.

In a conventional DC—DC converter, the converter circuit can no longer convert voltage when the on-duty ratio of the rectangular-wave, which is set on the basis of the detection voltage, reaches substantially 100%, so that the output voltage would start falling or rising, and thereby, the output voltage cannot be maintained at a predetermined value. Then, the feedback control is performed so as to increase the on-duty ratio more, which makes the feedback control impossible, and as a result, the output voltage falls to the earth potential or rises to the input voltage.

In the DC—DC converter using a duty-ratio setting circuit according to the invention, however, the rectangular-wave signal having a predetermined on-duty ratio is generated in the duty-ratio setting circuit when the feedback control is impossible. Then, it is possible to generate an output voltage determined in accordance with a predetermined on-duty ratio although the feedback control cannot maintain the output voltage at a predetermined value.

Accordingly, it is possible to give a time for taking measures such as a predetermined sheltering operation including sheltering of data or system information under a memory against the decrease of the input voltage even when the input voltage decreases due to consumption of a battery, for example, in a notebook-type of personal computer, a portable phone terminal and an electric appliance requiring motor control, which are driven by the DC—DC converter using the duty-ratio setting circuit according to the invention.

Moreover, in the DC—DC converter using the duty-ratio setting circuit according to the invention, the feedback control can maintain the output voltage at a constant value until the on-duty ratio reaches substantially 100%. Thus, it is possible in the DC—DC converter using the duty-ratio setting circuit to make a range of the input voltage wide as well as a range of the output voltage wide.

Another aspect of the invention is an electric appliance comprising: a DC—DC converter comprising a duty-ratio setting circuit according to any one of the above, a converter circuit and an output voltage detection circuit; a battery for supplying the DC—DC converter with the input voltage; and a main body of the electric appliance driven by using the output voltage of the DC—DC converter.

In such electric appliance, using a battery as a power supply to convert a voltage by means of the DC—DC converter using the duty-ratio setting circuit drives a main body of the electric appliance. An operation of the DC—DC converter therefore cannot be unstable, when the input voltage to the DC—DC converter decreases due to consumption of a battery to increase the on-duty ratio. Furthermore, it is possible to drive the main body of the electric appliance by obtaining a constant value of output voltage until the on-duty ratio of a switching element increases too much to continue the feedback control, so that a time period during which the main body of the electric appliance can be used by means of a battery would be extended in some cases.

Moreover, the switching element can be turned on and off in accordance with the rectangular-wave signal having a predetermined on-duty ratio, which is the second pulse signal, even after the feedback control cannot be continued. Then, the output voltage determined in accordance with the predetermined on-duty ratio and the input voltage (the between-terminal voltage of a battery) can be obtained, which enables a necessary sheltering operation such as sheltering of data or system information under a memory to be carried out before the power supply is cut.

The invention is applicable to any electric appliance so long as a battery drives the DC—DC converter using the duty-ratio setting circuit in the electric appliance and the output voltage therefrom is used for driving the main body of the electric appliance. The applicable electric appliances are, for example, a mobile personal computer of a notebook type or the like, a portable phone terminal, and a mobile sound-recorder, image-recorder and playback equipment for recording and reading out an image, sound or other information in or from a recording medium such as a compact disc and a DVD.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIGS. 2a–2e shows operational waveforms of respective sections in the DC—DC converter shown in FIG. 1;

FIGS. 3a–3e shows operational waveforms of respective sections in the DC—DC converter shown in FIG. 1 in the case that the control voltage Vfb becomes high;

FIG. 4 illustrates an operational principle of a duty-ratio setting circuit directed to the present invention;

FIG. 5 shows a circuit structure of a DC—DC converter directed to an embodiment;

FIGS. 6a–6f shows operational waveforms of respective sections in a DC—DC converter directed to an embodiment;

FIGS. 7a–7f shows operational waveforms of respective sections in a DC—DC converter directed to an embodiment in the case that the control voltage Vfb becomes high;

FIG. 8 is a circuit diagram showing an electric appliance employing a DC—DC converter directed to an embodiment;

FIG. 9 shows a circuit structure of a DC—DC converter directed to a modified embodiment;

FIG. 10 shows a circuit structure of a triangular-wave generator circuit;

FIG. 11 shows a circuit structure of a second-pulse-signal generator circuit.

DETAILED DESCRIPTION OF THE PREFERRED EMBODIMENT

Figure 1:
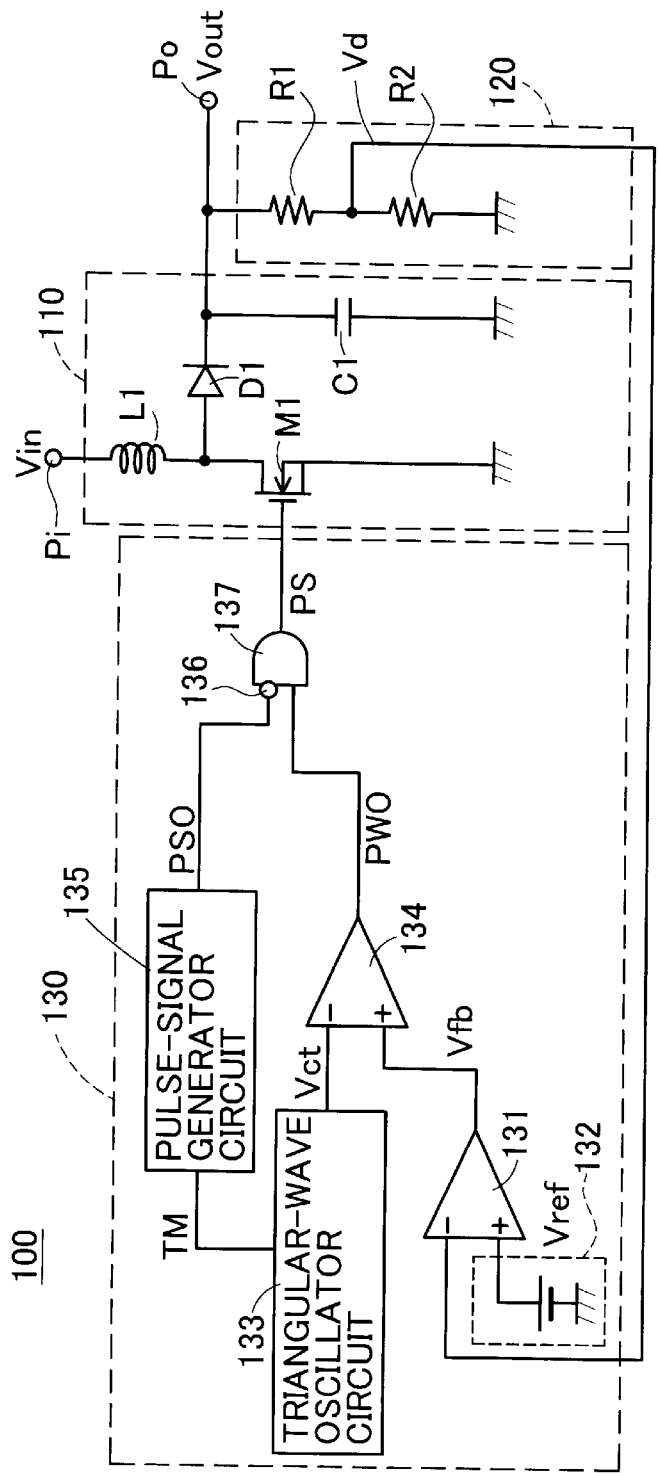
FIG. 1 shows a circuit structure of a DC—DC converter directed to the related art.

A DC—DC converter 10, a duty-ratio setting circuit 20 and an electric appliance 1 according to an embodiment of the invention are now described with reference to the drawings in FIGS. 4 to 8. First, an operational principle of the duty-ratio setting circuit 20 according to the embodiment is described, referring to FIG. 4. In a first-pulse-signal generator circuit 23, a control voltage Vfb generated in an error amplifier 21, which will be described below, is inputted to generate a first pulse signal PWO, which has been pulse-width modulated.

On the other hand, a second pulse signal PSO having a predetermined on-duty ratio is separately generated in a second-pulse-signal generator circuit 26. The above two pulse signals PWO and PSO are inputted in a selector circuit 27 and one of them is selected in accordance with the control voltage Vfb to be outputted as a rectangular-wave signal PS.

This makes it possible to output the rectangular-wave signal PS pulse-width modulated by means of the control voltage Vfb, as well as the rectangular-wave signal PS having a predetermined on-duty ratio by means of the same control voltage Vfb.

Furthermore, the waveform of the rectangular-wave signal PS cannot be abnormal due to difference in timing of change of the first pulse signal PWO and the second pulse signal PSO since one of the above two signals is selected.

Moreover, selection of the rectangular-wave signal PS can be switched from the first pulse signal PWO to the second pulse signal PSO at the time when a value of the control voltage Vfb becomes biased to a second direction with reference to a value of the control voltage Vfb, which is obtained in the case that the on-duty ratio of the first pulse signal PWO is substantially 100%, so that controlling can be performed in accordance with the first pulse signal PWO until the on-duty ratio substantially reaches 100%. Accordingly, the DC—DC converter 10 can carry out voltage conversion within a wide range of an input voltage Vin as well as a wide range of an output voltage Vout.

Next, a circuit structure and an operation of the DC—DC converter 10 according to the embodiment is described, referring to FIGS. 5 to 7. The DC—DC converter 10 has a converter circuit 110 for converting a positive input voltage Vin into a positive output voltage Vout, an output voltage detection circuit 120 for outputting a detection voltage Vd corresponding to the output voltage Vout and a duty-ratio setting circuit 20 for setting an on-duty ratio Don of a switching element M1 on the basis of the above detection voltage Vd.

The converter circuit 110 is the same as the converter circuit 110 of the DC—DC converter 100, which has been described before (see FIG. 1), and comprises an N-channel of MOS transistor M1, a coil L1, a capacitor C1 and a diode D1 for preventing a reverse current. The input voltage Vin is applied through the coil L1 to a drain of the transistor M1, while a source of the transistor M1 is connected to the ground. An anode of the diode D1 is connected to the drain of the transistor M1, while a cathode is connected to the output terminal Po. The capacitor C1 is connected between the output terminal Po and the ground.

The input voltage Vin is raised to be outputted as the output voltage Vout in accordance with ON/OFF control of the transistor M1. Changing the ratio between ON time Ton and OFF time Toff of the transistor M1 can control the output voltage Vout to at a predetermined value. The output voltage Vout is, concretely, given by an equation of Vout= {(Ton+Toff)/Toff} Vin=Vin/(1−Don).

The output voltage detection circuit 120 is the same as the output voltage detection circuit 120 of the DC—DC converter 100, which has been described before (see FIG. 1). In the output voltage detection circuit 120, the output voltage Vout at the output terminal Po is resistance-divided by resisters R1 and R2 to input the detection voltage Vd into the duty-ratio setting circuit 130.

The duty-ratio setting circuit 20 is somewhat different from the duty-ratio setting circuit 130 of the DC—DC converter 100, which has been described before (see FIG. 1). That is, the duty-ratio setting circuit 20 comprises an error amplifier 21, a first-pulse-signal generator circuit 23, a second-pulse-signal generator circuit 26 and a selector circuit 27.

The error amplifier 21 compares the detection voltage Vd inputted to an inverting input terminal with a first reference voltage Vref1 generated in a first-reference-voltage generator circuit 22 and inputted to a non-inverting input terminal and amplifies a difference voltage between the both voltages Vd and Vref1 to generate a control voltage Vfb.

The first-pulse-signal generator circuit 23 has a triangular-wave oscillator circuit 24 and a pulse-width modulator circuit 25. The triangular-wave oscillator circuit 24 outputs a triangular-wave voltage Vct in a shape of a triangular wave, which changes within a range from the maximum value Vcmax to the minimum value Vcmin, as shown in FIG. 6(A). The triangular-wave voltage Vct is inputted to the inverting input terminal of the pulse-width modulator circuit 25 and the control voltage Vfb is inputted to the non-inverting input terminal so as to make comparison between resultant triangular-wave voltage Vct and control voltage Vfb. In case level of the resultant triangular-wave voltage Vct exceeds that of the resultant control voltage Vfb, an output of the pulse-width modulator circuit 25 becomes low level. Accordingly, in case level of the control voltage Vfb is changed, the pulse width changes monotonously. Concretely, the first pulse signal PWO pulse-width modulated (PWM) is generated so that the pulse width at a high level becomes larger as the control voltage Vfb becomes higher.

The triangular-wave oscillator circuit 24 also outputs to the second-pulse-signal generator circuit 26 a timing signal TM other than the triangular-wave voltage Vct, the timing signal switching its signal level at a timing tmax at which the triangular-wave voltage Vct reaches the maximum value Vcmax. In the DC—DC converter 10 and the duty-ratio setting circuit 20 according to the embodiment, the on-duty ratio of the first pulse signal PWO becomes larger as the control voltage Vfb becomes higher, and therefore, the first direction is a direction that the voltage value becomes smaller while the second direction is a direction that the voltage value becomes larger.

The second-pulse-signal generator circuit 26 generates by means of the timing signal TM a second pulse signal PSO having a predetermined on-duty ratio (95%, for example) rising at the timing tmax at which the triangular-wave voltage Vct reaches the maximum value Vcmax. The transistor M1 turns on in the case that the second pulse signal PSO enters in a low level when the second pulse signal PSO is selected in a switch circuit 30, as described later. The on-duty ratio of the second pulse signal PSO is therefore calculated by using a low level period as an ON time Ton.

In the selector circuit 27, the first pulse signal PWO and the second pulse signal PSO are inputted, as described above, and one of them is selected to be outputted as a rectangular-wave signal PS. The selector circuit 27 has a switch-signal generator circuit 28 for generating a switch signal PC and a switch circuit 30 for switching and outputting either the first pulse signal PWO or the second pulse signal PSO on the basis of the switch signal PC. In the switch-signal generator circuit 28, the control voltage Vfb is compared with the second reference voltage Vref2 to output the switch signal PC. The switch signal PC is at a low level when the control voltage Vfb is lower than the second reference voltage Vref2, that is, when the value of the control voltage Vfb is biased to the first direction with reference to the second reference voltage Vref2. To the contrary, the switch signal PC is at a high level when the control voltage Vfb is higher than the second reference voltage Vref2, that is, when the value of the control voltage Vfb is biased to the second direction with reference to the second reference voltage Vref2. The switch circuit 30 has an NAND circuit 31 and an AND circuit 32. The NAND circuit 31 inputs the second pulse signal PSO and the switch signal PC and outputs an NAND output signal PN. The NAND output signal PN and the first pulse signal PWO are inputted in the AND circuit 32 and outputted to the transistor M1 as the rectangular-wave signal PS.

A case to be examined here is one that the control voltage Vfb is kept low and has a value smaller than the maximum value Vcmax of the triangular-wave voltage Vct, such as a case that the input voltage Vin is high enough due to no consumption of a battery (see FIG. 6(A)). The first-pulse-signal generator circuit 23 generates the first pulse signal PWO changing in pulse-width in accordance with a size of the control voltage Vfb (see FIG. 6(B)). The second reference voltage Vref2 is set at a value biased to the second direction with reference to the control voltage Vfb, that is, a large value, the control voltage Vfb generating the first pulse signal PWO having the maximum on-duty ratio (99%, for example) at which the output voltage Vout is kept to be controlled at a predetermined value even when the input voltage Vin is decreased. More concretely, the second reference voltage Vref2 is set at a value larger than the maximum value Vcmax of the triangular-wave voltage Vct. The switch signal PC is thus kept at a low level (see FIG. 6(C)).

The second pulse signal PSO generated in the second-pulse-signal generator circuit 26 has a short pulse width, which rises at a timing tmax that the triangular-wave voltage Vct reaches the maximum value Vcmax and which falls in a short time (see FIG. 6(D)). The waveform of the second pulse signal PSO has a predetermined on-duty ratio (95%, for example) without being influenced by the control voltage Vfb.

The NAND output signal PN of the NAND circuit 31 is kept at a high level regardless of the second pulse signal PSO since the switch signal PC is at a low level (see FIG. 6(E)). The rectangular-wave signal PS, which is an output of the AND circuit 32, is therefore the same as the first pulse signal PWO. Namely, the first pulse signal PWO is selected and outputted as the rectangular-wave signal PS (see FIG. 6(F)).

A case that the control voltage Vfb is increased due to decrease of the input voltage Vin resulting from consumption of a battery, for example, is examined hereinafter. In this case (see the left-hand of FIG. 7(A)), the control voltage Vfb becomes biased to the maximum value Vcmax of the triangular-wave voltage Vct. During a period T1 in which the control voltage Vfb is smaller than the maximum value Vcmax of the triangular-wave voltage Vct, however, the first pulse signal PWO is generated as well as the above-mentioned case although the pulse width is different (see the left-hand of FIG. 7(B)). The first pulse signal PWO falls slightly later than the timing tmax at which the triangular-wave voltage Vct reaches the maximum value Vcmax since the first pulse signal PWO is somewhat delayed from the triangular-wave voltage Vct due to the first pulse signal PWO being generated in the pulse-width modulator circuit 25.

The switch signal PC is kept at a low level since the second reference voltage Vref2 is set at a value larger than the maximum value Vcmax of the triangular-wave voltage Vct, as described above (see the left-hand of FIG. 7(C)).

The second pulse signal PSO generated in the second-pulse-signal generator circuit 26 has a short pulse width in which it rises at a timing tmax and falls in a short time without being influenced by change of the control voltage Vfb, and the on-duty ratio of the second pulse signal PSO is constant (see the left-hand of FIG. 7(D)). It is easily understood in comparison with FIG. 7(B) that there is a difference in the timing of change between the first pulse signal PWO and the second pulse signal PSO. The difference is caused by influence of a circuit delay.

The NAND output signal PN of the NAND circuit 31 is kept at a high level regardless of the second pulse signal PSO since the switch signal PC is at a low level (see the left-hand of FIG. 7(E)). The rectangular-wave signal PS outputted from the AND circuit 32 is therefore the same as the first pulse signal PWO regardless of the second pulse signal PSO (see the left-hand of FIG. 7(F)). That is, the rectangular-wave signal PS shows no abnormal waveform unlike the case of the related art described above (see FIG. 3(E)). This is because the first pulse signal is only selected without compounding the second pulse signal PSO and the first pulse signal PWO.

The control voltage Vfb sometimes further rises due to further decrease of the input voltage Vin or disturbance such as noise. In such a case, the control voltage Vfb exceeds the maximum value Vcmax of the triangular-wave voltage Vct (see the right-hand of FIG. 7(A)), so that the on-duty ratio Don of the first pulse signal PWO reaches 100% as shown in the right-hand of FIG. 7(B), is kept at a high level and keeps the transistor M1 on. Accordingly, the voltage cannot be converted in the converter circuit 110 and the output voltage Vout starts to fall rapidly. Then, the detection voltage Vd falls, and thereby, the difference between the detection voltage Vd in the error amplifier 21 and the first reference voltage Vref1 would increase. This makes the control voltage Vfb much larger, and at last, the control voltage Vfb exceeds the second reference voltage Vref2. The switch signal PC generated in the switch-signal generator circuit 28 is then switched from a low level to a high level (see the right-hand of FIG. 7(C)). Thus, during a period T2 in which the control voltage Vfb is larger than the maximum value Vcmax of the triangular-wave voltage Vct, the feed back control can no longer keep the output voltage Vout at a constant value.

In the second-pulse-signal generator circuit 26, the second pulse signal PSO is generated without any influence of change of the control voltage Vfb (see the right-hand of FIG. 7(D)). In the NAND circuit 31, the NAND output signal PN obtained by just inverting the second pulse signal PSO is outputted since the switch signal PC is at a high level (see the right-hand of FIG. 7(E)). The rectangular-wave signal PS outputted from the AND circuit 32 is therefore the same as the NAND output signal PN obtained by inverting the second pulse signal PSO regardless of the first pulse signal PWO (see the right-hand of FIG. 7(F)). In other words, the second pulse signal PSO is selected.

Accordingly, it is possible to generate a rectangular-wave signal PS having a predetermined on-duty ratio (95%, for example) during the period T2, except for the case that the on-duty ratio Don of the rectangular-wave signal PS reaches 100% transitionally. Therefore, the output voltage Vout determined in accordance with the on-duty ratio Don of the rectangular-wave signal PS (the second pulse signal PSO) is outputted from the converter circuit 110.

As described above, in the DC—DC converter 10 according to this embodiment, in the case that the output voltage Vout is feedback-controlled at a constant value, it is theoretically possible to continue the feedback control by means of the first pulse signal PWO until the on-duty ratio of the first pulse signal PWO reaches almost 100%. In practice, however, whether the feedback control can be continued or not is determined on the basis of the characteristics of a circuit forming the DC—DC converter 10 such as the maximum on-duty ratio at which the voltage can be converted in the converter circuit 110, due to influence by noise of the rectangular-wave signal PS and fluctuation in voltage or by characteristics of the coil L1, the switching element M1 or the like. There is an upper limit for the on-duty ratio capable of continuing the feedback control.

In such DC—DC converter 10, therefore, an operable range of the input voltage Vin can be wide, compared with the case of the DC—DC converter 100 according to the related art mentioned above. Otherwise, an operable range of the output voltage Vout can be wide, to the contrary.

In an electric appliance 1, which uses a battery BA as a power supply and which drives a main body 50 of an electric appliance by means of the DC—DC converter 10 having the duty-ratio setting circuit 20, as shown in FIG. 8, for example, the DC—DC converter 10 operates normally over the wide range to keep the output voltage Vout constant even when the input voltage Vin decreases due to consumption of the battery BA. It is accordingly possible to operate the main body 50 of the electric appliance for a period longer than the case of using the DC—DC converter 100 according to the related art mentioned above.

In addition, it is possible in the DC—DC converter 10 to continuously output the output voltage Vout given by an equation of Vout=Vin/(1−Don) by means of the rectangular-wave signal PS having a predetermined on-duty ratio Don even when the input voltage Vin extremely falls due to consumption of a battery, for example, so that the control voltage Vfb becomes too high to perform the feedback control. Thus, safe disconnecting operation can be performed in the main body 50 of the electric appliance such as a personal computer after a proper sheltering operation such as sheltering of data and/or system information under a hard disc or a non-volatile memory and sheltering or housing of a magnetic head of a hard disc.

(Modified Embodiment)

Now, a DC—DC converter 210 and a duty-ratio setting circuit 220 according to a modified embodiment are described with reference to FIGS. 9 to 12. FIG. 9 shows a circuit structure of the DC—DC converter 210 according to the modified embodiment. It can be seen by comparing the circuit structure of the first embodiment (see FIG. 5) with that of FIG. 9 that the circuit structure of the DC—DC converter 210 according to the modified embodiment is almost the same as that of the DC—DC converter 10 according to the first embodiment. A triangular-wave oscillator circuit 240 of a first-pulse-signal generator circuit 230 and a second-pulse-signal generator circuit 260, however, are different from those of the first embodiment and therefore, the difference will be mainly described hereinafter.

FIG. 10 shows a circuit structure of the triangular-wave generator circuit 240. In an amplifier AMP 1, a predetermined reference voltage V0 is compared with a terminal voltage Vr of a frequency setting resistance RT and an output corresponding to the difference therebetween is applied to a base of the transistor Q1, so that the terminal voltage Vr of the frequency setting resistance RT would be controlled to become constant. The current I1 flowing through a transistor Q2 is then controlled to have a constant value (I1=Vr/Rt). Selecting a resistance value Rt of the frequency setting resistance RT can change the value of the current I1 since the frequency setting resistance RT is externally connected.

Further, respective mirror currents I2 and I3 flowing through transistors Q4 and Q5 are considered to be constant currents equal to the current I1, since a transistor Q3 through which the current I1 flows together with the transistors Q4 and Q5 form a current mirror circuit (I1=I2=I3).

Two transistors Q6 and a transistor Q7 form a current mirror circuit. The transistor Q7 turns on as well as the two transistors Q6 turns on, when a transistor Q8 turns off. The constant mirror current I3 flows through the transistor Q5 into the transistor Q7, so that the same current I3 flows into the two respective transistors Q6. On the other hand, the transistor Q7 turns off as well as the two transistors Q6 turn off, when a transistor Q8 turns on.

Thus, the current I2 flowing through the transistor Q4 flows into a first capacitor CT when the transistor Q8 turns on and the transistors Q6 turn off, so that the terminal voltage (the triangular-wave voltage) Vct thereof would increase linearly. In the case that, to the contrary, the transistor Q8 turns off and the two transistors Q6 turn on, totally 2×I3 (=2×I2) of the current flows into the two transistors Q6. That is to say, the current I2 is discharged from the first capacitor CT. The terminal voltage Vct is thus decreased linearly.

It is assumed here that a inverting output Qx of a SR flip-flop FF becomes a high level, the transistor Q8 turns on, the transistors Q6 turn off and the first capacitor CT is charged to increase the terminal voltage Vct. An output of a comparator CP2 becomes a low level while an outputs Q and Qx of the SR flip-flop FF are not changed, when the terminal voltage Vct rises to exceed the reference voltage Vcmin. The output of the comparator CP1 becomes a high level to set the SR flip-flop FF when the terminal voltage Vct further rises to exceed the reference voltage Vcmax. The output Q then becomes a high level as well as the inverting output Qx changes into a low level. Thus, the transistor Q8 turns off, the transistors Q6 turn on and the first capacitor CT is discharged to decrease the terminal voltage Vct.

Just after the above, the terminal voltage Vct becomes smaller than the reference voltage Vcmax and the output of the comparator CP1 becomes a low level, but the outputs Q and Qx of the SR flip-flop FF do not change. Then, the output of a comparator CP2 becomes a high level to reset the SR flip-flop FF when the terminal voltage Vct further decreases to become smaller than the reference voltage Vcmin. This makes the output Q a low level and the inverting output Qx a high level. The transistor Q8 thus turns on, the transistors Q6 turn off and the first capacitor CT is charged to increase the terminal voltage Vct again.

The terminal voltage (the triangular-wave voltage) Vct of the first capacitor CT repeatedly changes between the maximum value Vcmax and the minimum value Vcmin in the shape of the triangular wave, as described above.

In the triangular-wave oscillator circuit 240, changing the capacitance value Ct of the first capacitor CT or the resistance value Rt of the frequency setting resistance RT can change the frequency fo and the cycle time T of the triangular-wave voltage Vct. Concretely, the frequency fo and the cycle time T are given by equations of $fo = Vr/(2Ct \cdot Rt \cdot (Vcmax - Vcmin))$ and $T = 1/fo = (2Ct \cdot Rt \cdot (Vcmax - Vcmin))/Vr$. Therefore, the frequency setting resistance RT corresponds to a frequency setting circuit in this modified embodiment.

The output Q of the SR flip-flop FF is inputted to the second-pulse-signal generator circuit 260 as a timing signal TM, which switches from a low level to a high level at a timing tamx that the triangular-wave voltage Vct reaches the maximum value Vcmax (see FIG. 6(A)). The triangular-wave oscillator circuit 240 can also be used in the first embodiment described above.

Figure 12A:
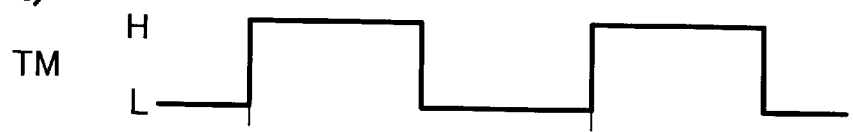
FIGS. 12a–12e shows operational waveforms of respective sections in a second-pulse-signal generator circuit.
Figure 12B:

Moreover, in the triangular-wave oscillator circuit 240, a base voltage of the transistor Q3 is outputted as a bias signal BI. In the case that the bias signal BI is used in the second-pulse-signal generator circuit 260 shown in FIG. 11, for example, the on-duty ratio of the second pulse signal PSO to be generated can be made constant even when the resistance value Rt of the frequency setting resistance RT is changed to change the frequency fo of the triangular-wave voltage Vct. Operations of respective sections in the second-pulse-signal generator circuit 260 are described hereinafter with reference to FIG. 12. A transistor Q9 forms a current mirror circuit together with the transistor Q3 of the above-mentioned triangular-wave oscillator circuit 240 (see FIG. 10). A mirror current I4 flowing through the transistor Q9 is therefore equal to the current I1 flowing through the transistor Q3. An output TMx of a first inverter INV1 changes as shown in FIG. 12(B) when the timing signal TM changes as shown in FIG. 12(A). A transistor Q10 turns off when the output TMx becomes a low level, so that the current I4 flows into the second capacitor C2, and thereby, a potential Vc2 increases linearly (see FIG. 12(C)). The capacitance of the second capacitor C2 has been made smaller than that of the first capacitor C1. This is for the purpose of increasing the potential Vc2 faster than the first capacitor CT by charging. When the potential Vc2 exceeds a threshold potential Vth, an output PI of the second inverter INV2 is inverted to become a low level (see FIG. 12(D)). Accordingly, performing an AND process of the timing signal TM (see FIG. 12(A)) and the output PI in the AND circuit AD can obtain the second pulse signal PSO having a short pulse width, which is at a high level only during both of the timing signal TM and the output PI are at a high level.

Figure 12C:
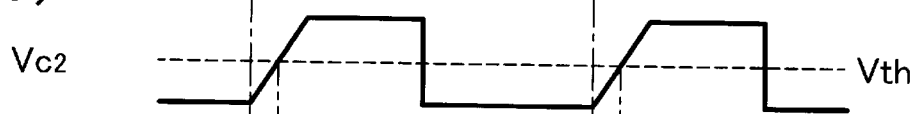
Figure 12D:
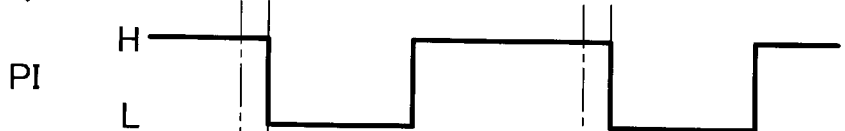
Figure 12E:
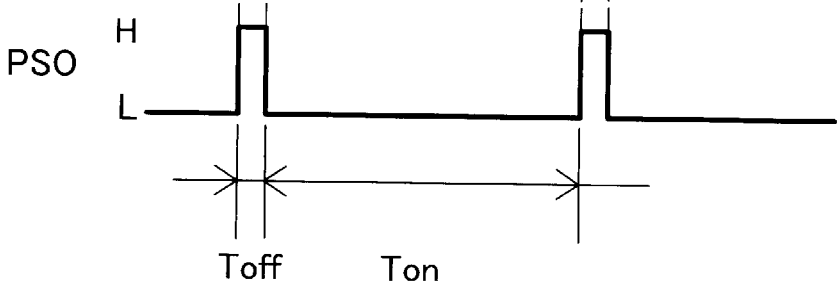

The pulse width Toff and the inclination of increase of the potential Vc2 (see FIG. 12(C)) are proportional to the current I4 (=I1). On the other hand, the cycle time T of the triangular-wave voltage Vct generated in the triangular-wave oscillator circuit 240 is proportional to the resistance value Rt of the frequency setting resistance RT, as described above. Therefore, changing the resistance value Rt of the frequency setting resistance RT to change the frequency fo (the cycle time T) of the triangular-wave voltage Vct causes the pulse width Toff of the second pulse signal PSO to be changed, so that the duty-ratio (on-duty ratio) of the second pulse signal PSO would not be changed after all.

As described above, in the DC—DC converter 210 according to the modified embodiment, appropriately changing the resistance value Rt of the frequency setting resistance RT can appropriately change, in accordance with specification of a main body 50 of the electric appliance to be used, the frequency of the triangular-wave voltage Vct and that of the first pulse signal PWO (the rectangular-wave signal PS) generated by the triangular-wave voltage Vct. Moreover, the on-duty ratio Don is not changed in accordance with the frequency even in the case of using the second pulse signal PSO as the rectangular-wave signal PS due to consumption of the battery BA. Therefore, the output voltage Vout to be outputted is advantageously the same as the voltage given by an equal of Vout=Vin/(1−Don) in the case that the input voltage Vin is the same.

The embodiment and the modified embodiment of the invention are described above. It goes, however, without saying that the invention is not limited to the above embodiments and can be appropriately modified for application within a range not exceeding the substance thereof.

For example, in the above embodiments, exemplified are the first-pulse-signal generator circuits 23 and 230 comprising the triangular-wave oscillator circuits 24 and 240 and the pulse-width modulator circuit 25. This is because a first pulse signal having an appropriate on-duty ratio can be easily obtained. The first-pulse-signal generator circuit is, however, only required to have an oscillator circuit for generating an oscillating signal showing a predetermined repeat-voltage waveform and a pulse-width modulator circuit for comparing the voltage of the oscillating signal with the control voltage Vfb to generate the first pulse signal PWO. Therefore, any repeat waveform having constant amplitude and a constant cycle time such as sine wave or saw wave can be used for a repeat-voltage waveform generated in the oscillator circuit other than the triangular-wave voltage Vct (see FIG. 6(A)) in which the inclination in rising and falling of the voltage is equal. Especially, it is particularly preferable to use the triangular-wave in which the change of the control voltage and the on-duty ratio has a relation of a linear equation, as described in the embodiment.

In the above embodiments, the duty-ratio setting circuits 20 and 220 are used for the DC—DC converters 10 and 210 having a step-up type of converter circuit 110. They can be also applied for a step-down type of DC—DC converter.

The case is explained in which the second reference voltage Vref2 is larger than the maximum value Vcmax of the triangular-wave voltage Vct in the above description, but it is possible to apply the second reference voltage Vref2 having a smaller value than the maximum value Vcmax. In such case, however, the control value Vfb exceeds the second reference voltage Vref2 at the time when the on-duty ratio of the first pulse signal PWO becomes a particular value lower than 100%, so that the second pulse signal would be selected. Therefore, it is preferable that the second reference value Vref2 is set so as to become larger than the maximum value Vcmax of the triangular-wave voltage Vct.

Further, the second pulse signal PSO is generated by means of the timing signal TM from the triangular-wave oscillator circuits 24 and 240 in the above embodiments. That is, the second pulse signal PSO is generated in the second-pulse generator circuits 26 and 260 on the basis of the timing signal TM generated synchronously with the first pulse signal PWO in the first-pulse generator circuits 23 and 230. Accordingly, the second pulse signal PSO and the first pulse signal PWO are synchronous signals having the same frequency. It is therefore not necessary to provide an original oscillator circuit for generating the second pulse signal PSO, so that the second pulse signal PSO can be easily generated in the second-pulse generator circuits 26 and 260 having a simple structure. The second pulse signal PSO is, however, not necessarily synchronized with the first pulse signal PWO so long as it has a predetermined on-duty ratio. Namely, the second pulse signal PSO can be generated independently of the first pulse signal. It is preferable, however, to synchronize both of the first pulse signal PWO and the second pulse signal PSO as described in the above modified embodiment since adjustment of the frequency is troublesome in the case that the frequency of the rectangular-wave signal PS is set at a desired value even when either the first pulse signal PWO or the second pulse signal PSO is selected.

In the above embodiments, exemplified are the DC—DC converters 10 and 210 for outputting the positive output voltage Vout. The invention can be, however, also applied to the DC—DC converter for outputting the negative output voltage.

Furthermore, the duty-ratio setting circuit 20 is constructed in the above embodiments so that the on-duty ratio of the rectangular-wave signal PS (the first pulse signal PWO) would increase as the control voltage Vfb increases. It is also possible, however, to construct the duty-ratio setting circuit so that the on-duty ratio of the rectangular-wave signal PS (the first pulse signal PWO) would increase as the control voltage Vfb decreases, to the contrary. Moreover, it can be also arranged such that the DC—DC converter including the duty-ratio setting circuit is driven at the negative voltage.

What is claimed is:

1. A DC—DC converter comprising:

a converter circuit which includes a switching element and switches the switching element by means of a rectangular-wave signal to convert an input voltage into an output voltage having a value different from a value of the input voltage;

an output voltage detection circuit for detecting the value of the output voltage to output a detection voltage; and a duty-ratio setting circuit for generating on the basis of the detection voltage the rectangular-wave signal in which the on-duty ratio is set so that the output voltage would be controlled at a predetermined value and for outputting the rectangular-wave signal to the switching element, wherein the duty-ratio setting circuit comprises:

a control-voltage generator circuit for inputting a first reference voltage and the detection voltage to output the control voltage corresponding to a difference therebetween;

a first-pulse generator circuit for inputting the control voltage to output a first rectangular pulse signal in which the on-duty ratio changes monotonously with relation to the change of the control voltage;

a second-pulse generator circuit for generating a second rectangular pulse signal having a predetermined on-duty ratio; and a selector circuit for selecting one of the first pulse signal and the second pulse signal to output the one as the rectangular-wave signal, in which the first pulse signal is selected and outputted when the control voltage is biased to a first direction compared with the second reference voltage while the second pulse signal is selected and outputted when the control voltage is biased to a second direction compared with the second reference voltage, the first direction being a direction that the on-duty ratio of the first pulse signal becomes smaller as the control voltage is changed, and the second direction being a direction that the on-duty ratio becomes larger to the contrary.

2. A DC—DC converter according to claim 1, wherein the second reference voltage has a value biased to the second direction with reference to the control voltage for generating the first pulse signal having the maximum on-duty ratio, which can continuously control the output voltage at a predetermined value even when the input voltage is decreased.

3. A DC—DC converter according to claim 1, wherein the selector circuit comprises:

a switch-signal generator circuit for outputting a switch signal, which instructs selection of the first pulse signal when the control voltage is biased to the first direction with reference to the second reference voltage and which instructs selection of the second pulse signal when the control voltage is biased to the second direction with reference to the second reference voltage in comparison between the control voltage and the second reference voltage; and a switch circuit for inputting the switch signal, the first pulse signal and the second pulse signal to output one of the first pulse signal and the second pulse signal in accordance with the switch signal.

4. A DC—DC converter according to claim 1, wherein the selector circuit selects and outputs the first pulse signal when the control voltage has a value smaller than that of the second reference voltage while the selector circuit selects and outputs the second pulse signal when the control voltage has a value larger than that of the second reference voltage, and wherein the selector circuit comprises:

a switch-signal generator circuit for setting a switch signal at a low level when the control voltage is smaller than the second reference voltage and at a high level when the control voltage is larger than the second reference voltage in comparison between the control voltage and the second reference voltage; and a switch circuit for inputting the switch signal, the first pulse signal and the second pulse signal to output one of the first pulse signal and the second pulse signal in accordance with the switch signal, the switch circuit outputting the first pulse signal when the switch signal is at a low level while outputting the second pulse signal when the switch signal is at a high level.

5. A DC—DC converter according to claim 4, wherein the switch circuit comprises:

a NAND circuit for inputting the switch signal and the second pulse signal; and an AND circuit for inputting the first pulse signal and the output of the NAND circuit.

6. A DC—DC converter according to claim 1, wherein the first-pulse generator circuit has a frequency setting circuit for setting a frequency of the first pulse signal, and wherein the second-pulse generator circuit generates the second pulse signal synchronous with the first pulse signal, the second pulse signal having a constant on-duty ratio regardless of the set frequency of the first and second pulse signals.

7. A DC—DC converter according to claim 6, wherein the first-pulse generator circuit has a triangular-wave generator circuit which includes a first capacitor and alternately generates a first period during which a predetermined amount of current flows into the first capacitor and a second period during which the predetermined amount of current flows from the first capacitor to change a between-terminal voltage of the first capacitor into a shape of triangle, the triangular-wave generator circuit outputting a timing signal that the voltage level is switched from high to low or from low to high in accordance with a switching timing from the first period to the second period, and wherein the second-pulse generator circuit has:

a current mirror circuit for running a mirror current equal to the predetermined current amount;

a second capacitor having capacitance smaller than that of the first capacitor;

a charger/discharger circuit for alternately switching between charge by the mirror current flowing into the second capacitor and discharge of the second capacitor in accordance with the timing signal; and a logic process circuit for generating the second pulse signal on the basis of a timing that a between-terminal voltage of the second capacitor exceeds a predetermined level of voltage at the charging time of the second capacitor and a timing for switching the timing signal.

8. A DC—DC converter comprising:

a converter circuit which includes a switching element and switches the switching element by means of a rectangular-wave signal to convert an input voltage into an output voltage having a value different from that of the input voltage;

an output voltage detection circuit for detecting the value of the output voltage to output a detection voltage; and a duty-ratio setting circuit for outputting to the switching element the rectangular-wave signal in which the on-duty ratio is set on the basis of the detection voltage so that the output, voltage would become a predetermined value and for carrying out feedback control, wherein the duty-ratio setting circuit generates the rectangular-wave signal having a predetermined on-duty ratio when the on-duty ratio of the rectangular-wave signal set on the basis of the detection voltage reaches substantially 100% and the feedback control becomes impossible.

9. An electric appliance comprising:

a DC—DC converter including a converter circuit which includes a switching element and switches the switching element by means of a rectangular-wave signal to convert an input voltage into an output voltage having a value different from that of the input voltage, an output voltage detection circuit for detecting the value of the output voltage to output a detection voltage, and a duty-ratio setting circuit for generating on the basis of the detection voltage the rectangular-wave signal in which the on-duty ratio is set so that the output voltage would be controlled at a predetermined value and for outputting the rectangular-wave signal to the switching element, wherein the duty-ratio setting circuit includes a control-voltage generator circuit for inputting the first reference voltage and the detection voltage to output the control voltage corresponding to a difference therebetween, a first-pulse generator circuit for inputting the control voltage to output a first rectangular pulse signal in which the on-duty ratio changes monotonously with reference to the change of the control voltage, a second-pulse generator circuit for generating a second rectangular pulse signal having a predetermined on-duty ratio, and a selector circuit for selecting one of the first pulse signal and the second pulse signal to output the one as the rectangular-wave signal, in which the first pulse signal is selected and outputted when the control voltage is biased to a first direction compared with the second reference voltage while the second pulse signal is selected and outputted when the control voltage is biased to a second direction compared with the second reference voltage, the first direction being a direction that the on-duty ratio of the first pulse signal becomes smaller as the control voltage is changed, and the second direction being a direction that the on-duty ratio becomes larger to the contrary;

a battery for supplying the DC—DC converter with the input voltage; and a main body of the electric appliance driven by using the output voltage of the DC—DC converter.

10. A duty-ratio setting circuit, which is used for a DC—DC converter comprising a converter circuit which includes a switching element and switches the switching element by means of a rectangular-wave signal to convert an input voltage into an output voltage having a value different from that of the input voltage and an output voltage detection circuit for detecting the value of the output voltage to output a detection voltage, for setting on the basis of the detection voltage an on-duty ratio of the rectangular-wave signal so that the output voltage would be controlled at a predetermined value, the duty-ratio setting circuit comprising:

a control-voltage generator circuit for inputting a first reference voltage and the detection voltage to output the control voltage corresponding to a difference therebetween;

a first-pulse generator circuit for inputting the control voltage to output a first rectangular pulse signal in which the on-duty ratio changes monotonously in accordance with the change of the control voltage;

a second-pulse generator circuit for generating a second rectangular pulse signal having a predetermined on-duty ratio; and a selector circuit for selecting and outputting one of the first pulse signal and the second pulse signal, in which the first pulse signal is selected and outputted when the control voltage has a value biased to a first direction with reference to the second reference voltage while the second pulse signal is selected and outputted when the control voltage has a value biased to a second direction with reference to the second reference voltage, the first direction being a direction that the on-duty ratio of the first pulse signal becomes smaller as the control voltage is changed, and the second direction being a direction that the on-duty ratio becomes larger to the contrary.

11. A duty-ratio setting circuit according to claim 10, wherein, in the case of being used for the DC—DC converter, the second reference voltage has a value biased to the second direction with reference to the control voltage for generating the first pulse signal having the maximum on-duty ratio, which can continuously control the output voltage at a predetermined value even when the input voltage is decreased.

12. A duty-ratio setting circuit according to claim 10, wherein the selector circuit comprises:

a switch-signal generator circuit for outputting a switch signal, which instructs selection of the first pulse signal when the control voltage is biased to the first direction with reference to the second reference voltage and which instructs selection of the second pulse signal when the control voltage is biased to the second direction than the second reference voltage in comparison between the control voltage and the second reference voltage; and a switch circuit for inputting the switch signal, the first pulse signal and the second pulse signal to output one of the first pulse signal and the second pulse signal in accordance with the switch signal.

13. A duty-ratio setting circuit according to claim 10, wherein the selector circuit selects and outputs the first pulse signal when the control voltage has a value smaller than that of the second reference voltage while the selector circuit selects and outputs the second pulse signal when the control voltage has a value larger than that of the second reference voltage, and wherein the selector circuit comprises:
a switch-signal generator circuit for setting a switch signal at a low level when the control voltage is smaller than the second reference voltage and at a high level when the control voltage is larger than the second reference voltage in comparison between the control voltage and the second reference voltage; and a switch circuit for inputting the switch signal, the first pulse signal and the second pulse signal to output one of the first pulse signal and the second pulse signal in accordance with the switch signal, the switch circuit outputting the first pulse signal when the switch signal is at a low level while outputting the second pulse signal when the switch signal is at a high level.

14. A duty-ratio setting circuit according to claim 13, wherein the switch circuit comprises:
a NAND circuit for inputting the switch signal and the second pulse signal; and
an AND circuit for inputting the first pulse signal and the output of the NAND circuit.

15. A duty-ratio setting circuit according to claim 10, wherein the first-pulse generator circuit has a frequency setting circuit for setting a frequency of the first pulse signal, and wherein the second-pulse generator circuit generates the second pulse signal synchronous with the first pulse signal, the second pulse signal having a constant on-duty ratio regardless of the set frequency of the first and second pulse signals.

16. A duty-ratio setting circuit according to claim 15, wherein the first-pulse generator circuit has a triangular-wave generator circuit which includes a first capacitor and alternately generates a first period during which a predetermined amount of current flows into the first capacitor and a second period during which the predetermined amount of current flows from the first capacitor to change a between-terminal voltage of the first capacitor into a shape of triangle, the triangular-wave generator circuit outputting a timing signal that the voltage level is switched from high to low or from low to high in accordance with a switching timing from the first period to the second period, and wherein the second-pulse generator circuit has:
a current mirror circuit for running a mirror current equal to the predetermined current amount;
a second capacitor having capacitance smaller than that of the first capacitor;

a charger/discharger circuit for alternately switching between charge by the mirror current flowing into the second capacitor and discharge of the second capacitor in accordance with the timing signal; and a logic process circuit for generating the second pulse signal on the basis of a timing that a between-terminal voltage of the second capacitor exceeds a predetermined level of voltage at the charging time of the second capacitor and a timing for switching the timing signal.

17. A duty-ratio setting circuit used for a DC—DC converter comprising a converter circuit which includes a switching element and switches the switching element by means of a rectangular-wave signal to convert an input voltage into an output voltage having a value different from that of the input voltage and an output voltage detection circuit for detecting the value of the output voltage to output a detection voltage, the duty-ratio setting circuit outputting to the switching element the rectangular-wave signal in which the on-duty ratio is set on the basis of the detection voltage so that the output voltage would become a predetermined value and carrying out feedback control, and the duty-ratio setting circuit generating the rectangular-wave signal having a predetermined on-duty ratio, when the on-duty ratio of the rectangular-wave signal set on the basis of the detection voltage reaches substantially 100% and the feedback control becomes impossible.

18. An electric appliance comprising:
a DC—DC converter comprising
a duty-ratio setting circuit, which is used for the DC—DC converter comprising a converter circuit which includes a switching element and switches the switching element by means of a rectangular-wave signal to convert an input voltage into an output voltage having a value different from that of the input voltage and an output voltage detection circuit for detecting the value of the output voltage to output a detection voltage, for setting on the basis of the detection voltage an on-duty ratio of the rectangular-wave signal so that the output voltage would be controlled at a predetermined value, the duty-ratio setting circuit comprising
a control-voltage generator circuit for inputting a first reference voltage and the detection voltage to output the control voltage corresponding to a difference therebetween,
a first-pulse generator circuit for inputting the control voltage to output a first rectangular pulse signal in which the on-duty ratio changes monotonously in accordance with the change of the control voltage,
a second-pulse generator circuit for generating a second rectangular pulse signal having a predetermined on-duty ratio and
a selector circuit for selecting and outputting one of the first pulse signal and the second pulse signal, in which the first pulse signal is selected and outputted when the control voltage has a value biased to a first direction with reference to the second reference voltage while the second pulse signal is selected and outputted when the control voltage has a value biased to a second direction with reference to the second reference voltage, the first direction being a direction that the on-duty ratio of the first pulse signal becomes smaller as the control voltage is changed, and the second direction being a direction that the on-duty ratio becomes larger to the contrary, the converter circuit and
the output voltage detection circuit;

a battery for supplying the DC—DC converter with the input voltage; and a main body of the electric appliance driven by using the output voltage of the DC—DC converter.

* * * * *